(12) United States Patent
Fang et al.

(10) Patent No.: US 12,442,878 B2
(45) Date of Patent: Oct. 14, 2025

(54) IMAGING SYSTEMS

(71) Applicant: SHANGHAI UNITED IMAGING HEALTHCARE CO., LTD., Shanghai (CN)

(72) Inventors: Fuyi Fang, Shanghai (CN); Kaihua Lu, Shanghai (CN); Feng Xu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 94 days.

(21) Appl. No.: 18/335,094

(22) Filed: Jun. 14, 2023

(65) Prior Publication Data
US 2023/0400543 A1 Dec. 14, 2023

(30) Foreign Application Priority Data

Jun. 14, 2022 (CN) .......................... 202221495623.7
Jul. 15, 2022 (CN) .......................... 202210830392.9

(51) Int. Cl.
G01R 33/48 (2006.01)
A61B 6/42 (2024.01)
A61B 6/00 (2006.01)

(52) U.S. Cl.
CPC .......... G01R 33/481 (2013.01); A61B 6/4258 (2013.01); *A61B 6/4417* (2013.01)

(58) Field of Classification Search
CPC ............ G01R 33/481; G01R 33/34007; G01R 33/34046; G01R 33/422; A61B 6/4258; A61B 6/4417; A61B 5/055; A61B 6/4275
See application file for complete search history.

(56) References Cited

U.S. PATENT DOCUMENTS

2012/0253174 A1* 10/2012 Popescu .................. A61B 6/42
600/411
2020/0237320 A1* 7/2020 Fang ..................... A61B 6/4417

FOREIGN PATENT DOCUMENTS

WO WO-2022076957 A1 * 4/2022 ............. A61B 5/055

* cited by examiner

*Primary Examiner* — G. M. A Hyder
(74) *Attorney, Agent, or Firm* — METIS IP LLC

(57) ABSTRACT

The embodiments of the present disclosure provide an imaging system, the imaging system may include a volume coil; a support assembly, wherein the volume coil is configured to surround an outer side of the support assembly or the support assembly is configured to surround an outer side of the volume coil; and a detector, installed on the support assembly and configured to receive gamma photons generated by radionuclides from a subject.

20 Claims, 21 Drawing Sheets

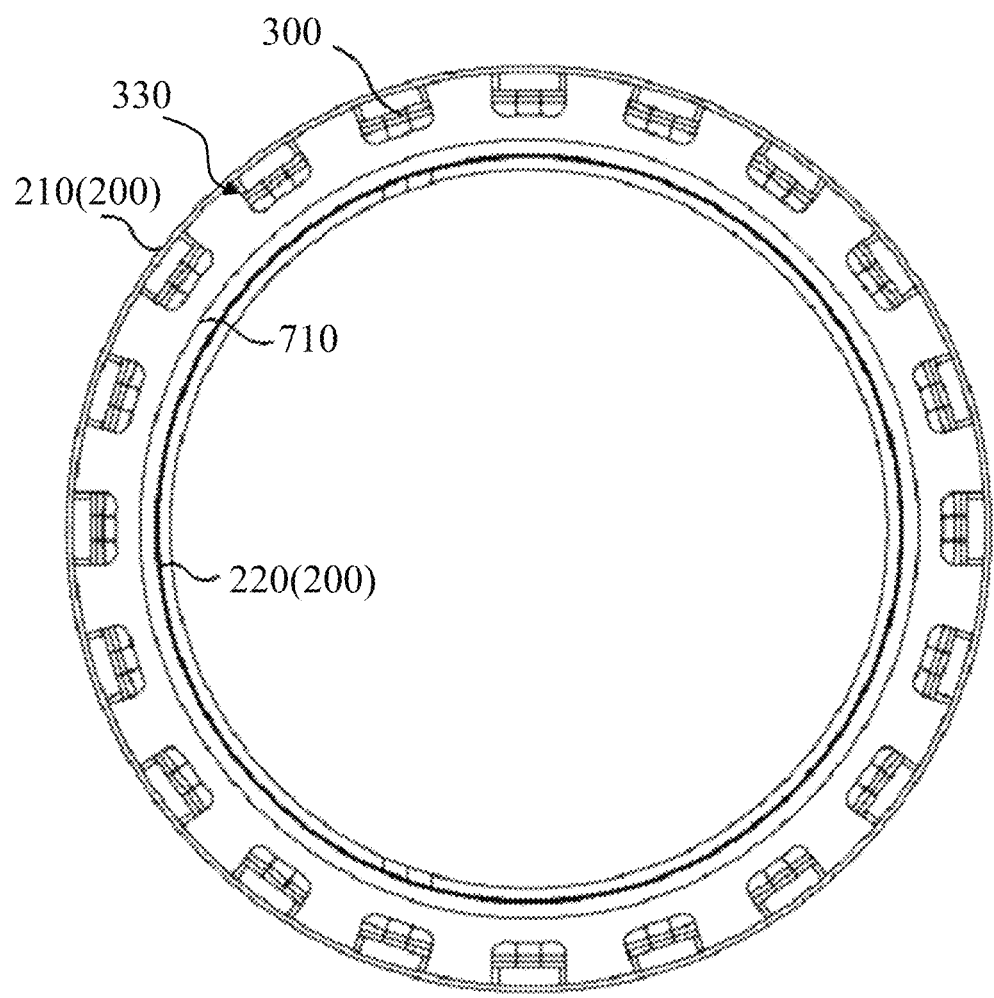
Amended FIG. 2

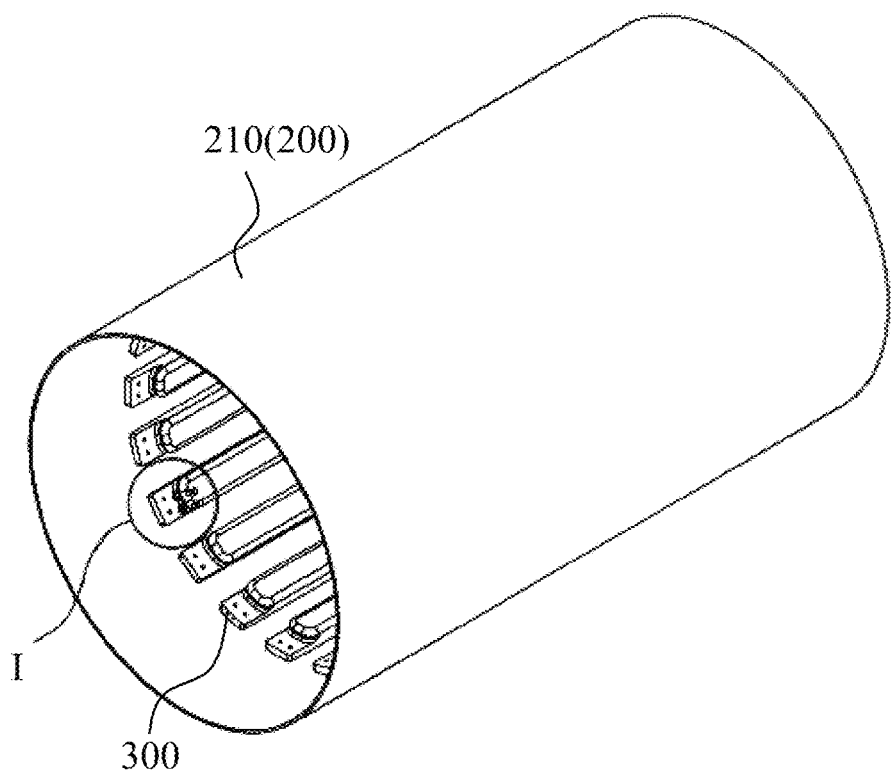
Amended FIG. 3A
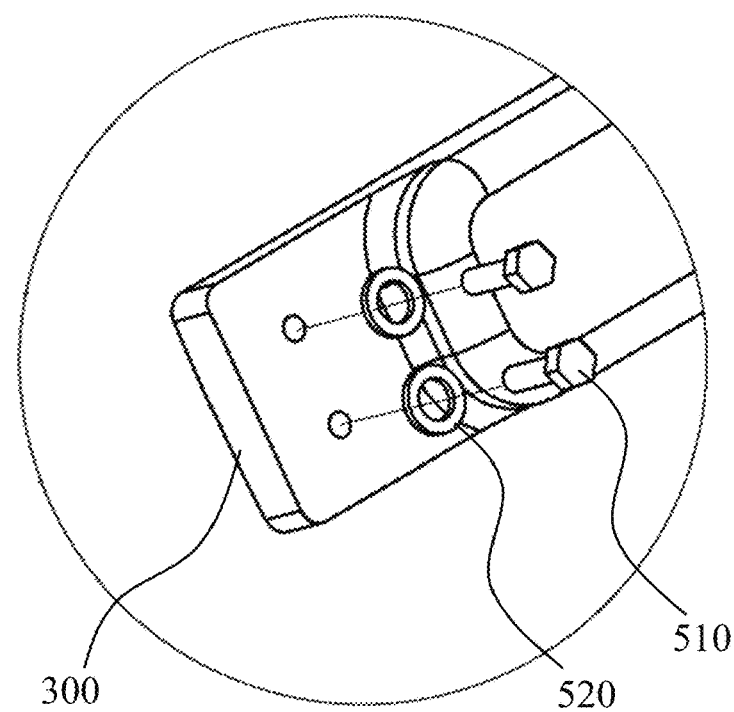
FIG. 3B

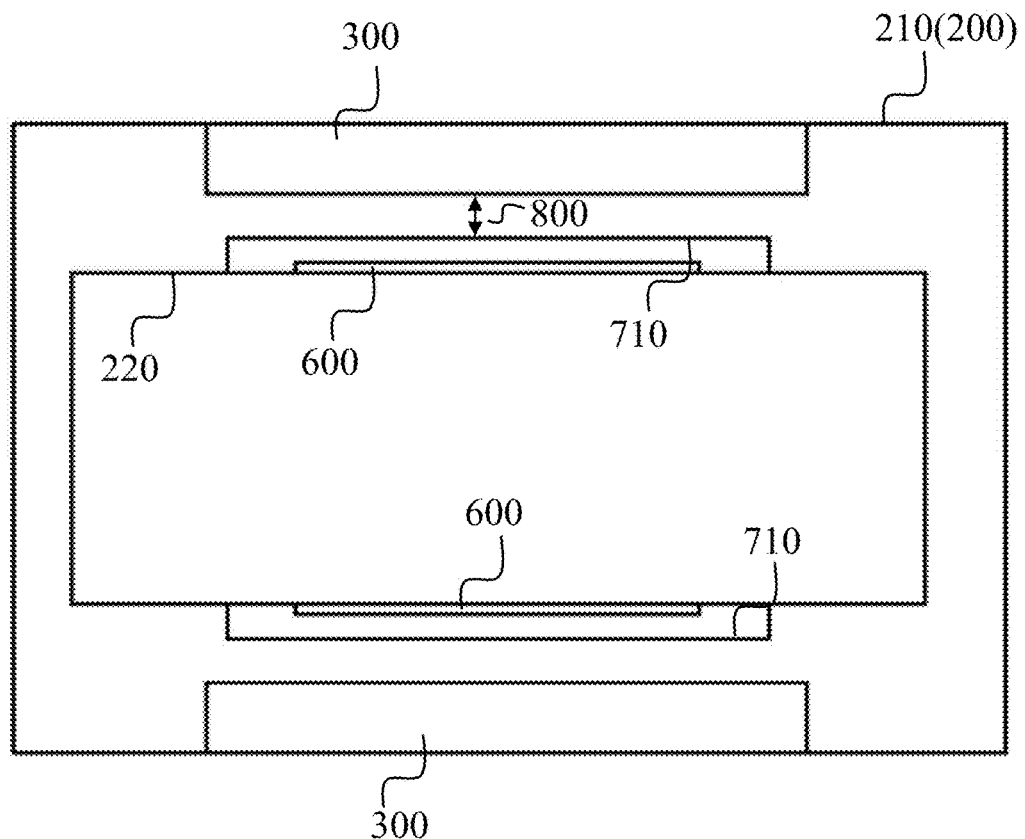
Amended FIG. 4A
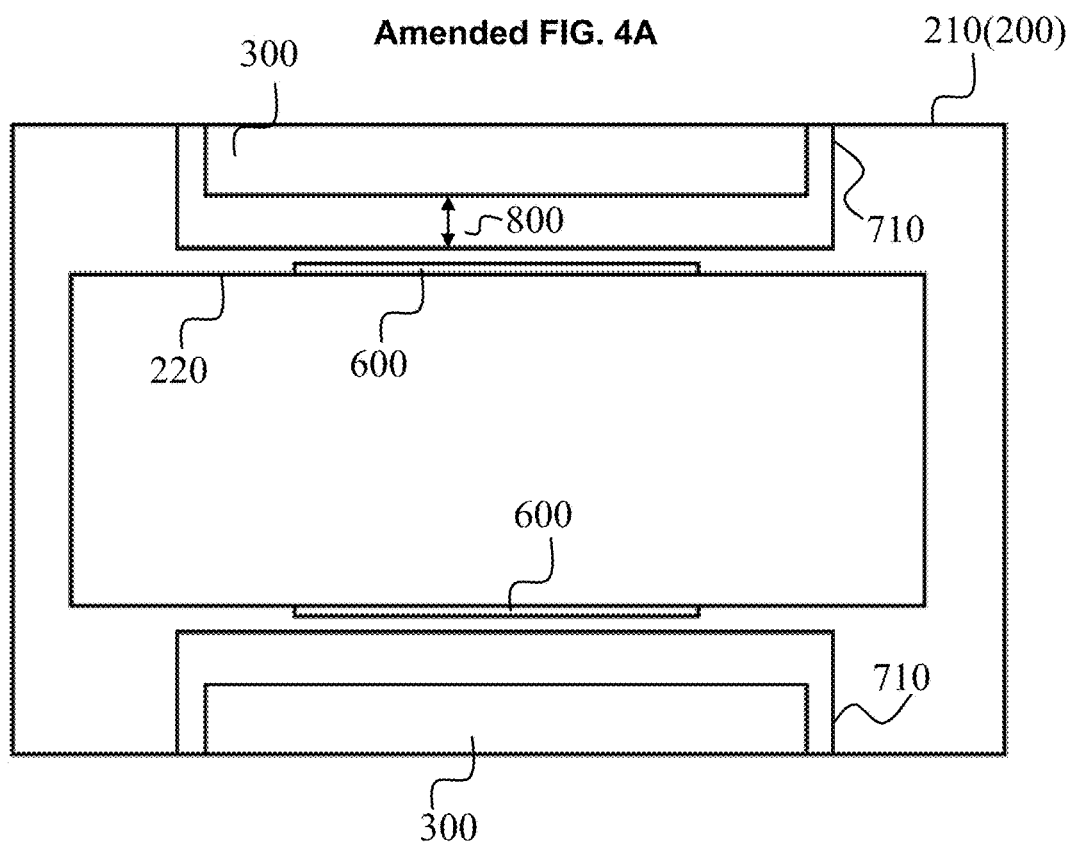
Amended FIG. 4B

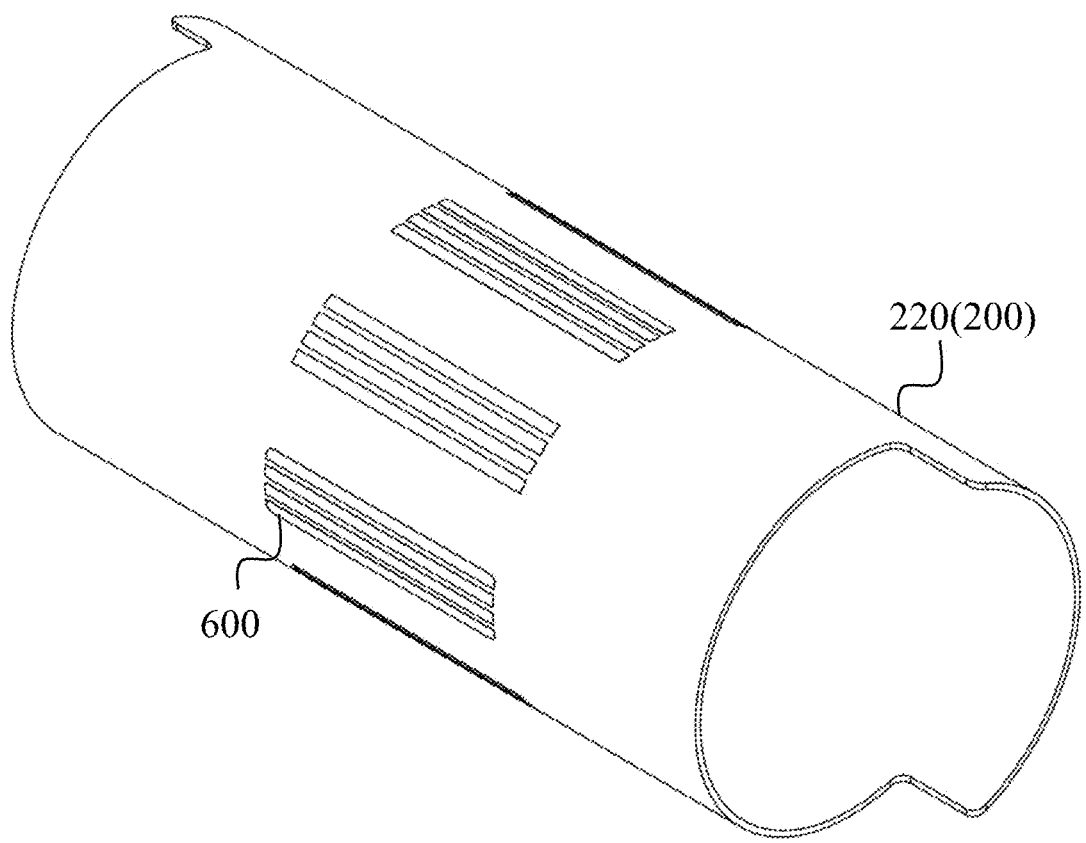
Amended FIG. 5

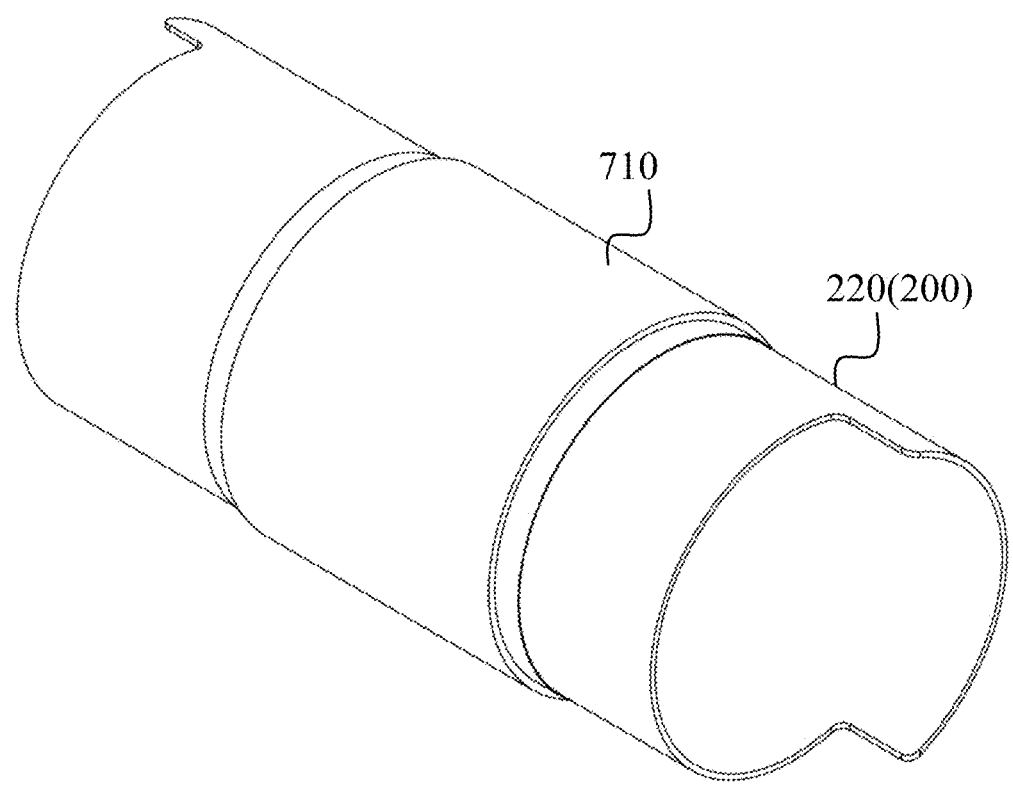
Amended FIG. 6

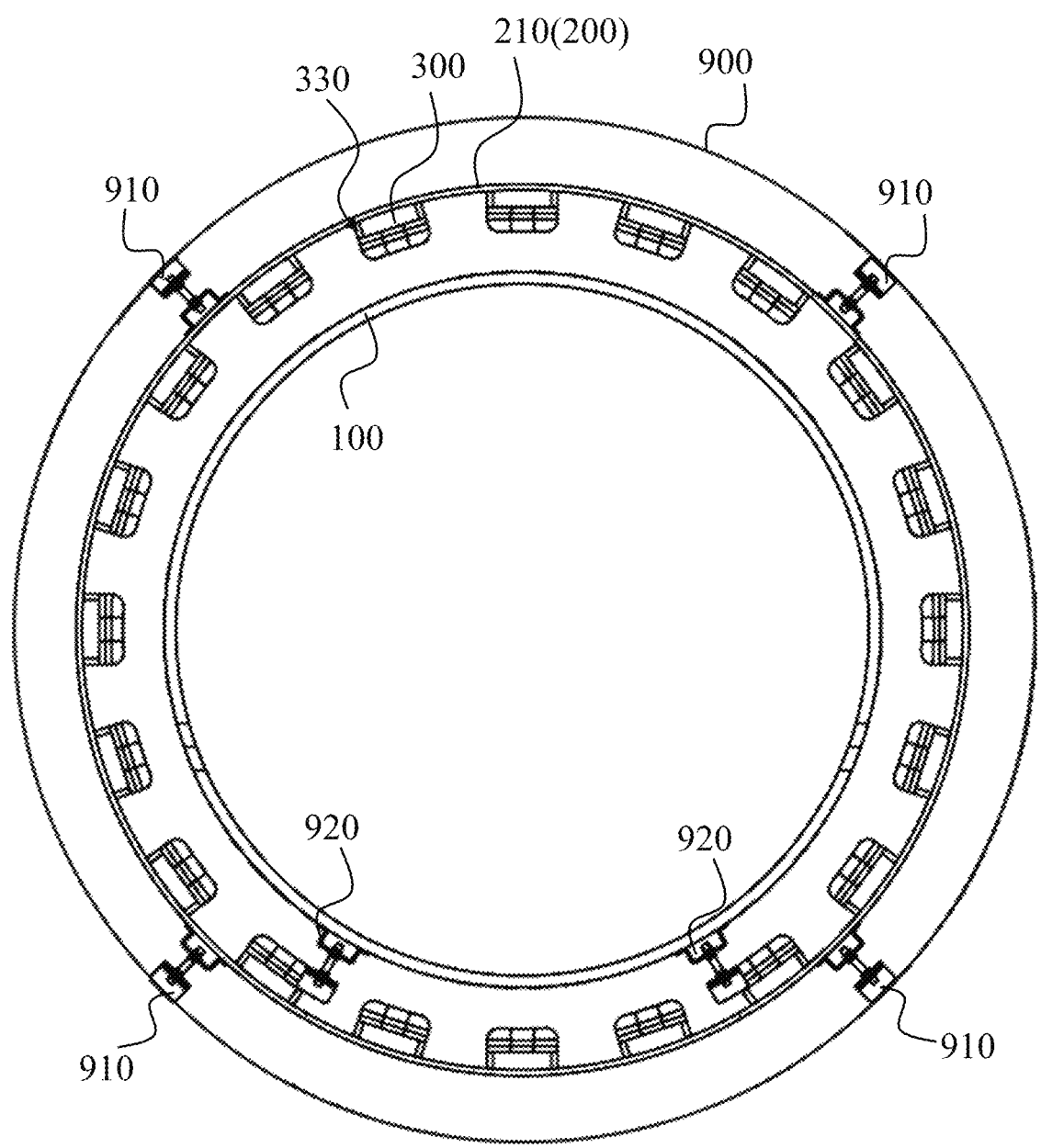
Amended FIG. 7

Amended FIG. 9

Amended FIG. 10

Amended FIG. 11

Amended FIG. 12

Amended FIG. 13

Amended FIG. 14

Amended FIG. 15

Amended FIG. 16

Amended FIG. 17

Amended FIG. 18

Amended FIG. 19

Amended FIG. 20

IMAGING SYSTEMS

CROSS-REFERENCE TO RELATED APPLICATIONS

This application claims priority to Chinese Patent Application No. 202221495623.7, filed on Jun. 14, 2022, and Chinese Patent Application No. 202210830392.9, filed on Jul. 15, 2022, the contents of which are incorporated herein by reference.

TECHNICAL FIELD

The present disclosure relates to the field of medical imaging, and in particular, to imaging systems.

BACKGROUND

A positron emission tomography (PET)-magnetic resonance imaging (MRI) may integrate a PET scanner with an MRI scanner to achieve simultaneous PET imaging and MR imaging. However, the PET-MRI may integrate both a detector and a volume coil onto a volume coil cylinder. It is difficult to disassemble during maintaining the PET-MRI. If the detector needs to be repaired and the volume coil needs to be disassembled, the PET-MRI may be easy to be damaged.

Therefore, it is desirable to provide imaging systems to reduce the difficulty of disassembling the imaging systems and facilitate independent disassembly of the detector and the volume coil by introducing a support assembly.

SUMMARY

One aspect of embodiments of the present disclosure may provide an imaging system. The imaging system may comprise: a volume coil; a support assembly, wherein the volume coil may be configured to surround an outer side of the support assembly or the support assembly may be configured to surround an outer side of the volume coil; and a detector, installed on the support assembly and configured to receive gamma photons generated by radionuclides from a subject.

In some embodiments, the support assembly may include a support cylinder, the support cylinder surrounding the outer side of the volume coil; the detector may be arranged inside of the support cylinder; and the detector may be located between the support cylinder and the volume coil.

In some embodiments, the volume coil may further include a radio frequency component arranged between a coil cylinder and the detector, configured to transmit or receive the radio frequency signal; the imaging system may further include the coil cylinder, configured to support the radio frequency component; and a shielding layer arranged between the radio frequency component and the detector to shield a signal interference between the detector and the radio frequency component.

In some embodiments, the support cylinder and the coil cylinder may be arranged coaxially and assembled separately.

In some embodiments, the imaging system may further include a support frame arranged on the outside of the support cylinder, a connecting component may be arranged between the support frame and the support cylinder, and the connecting component may be configured to connect the support frame with the support cylinder.

In some embodiments, the imaging system may further include a second connecting component arranged between the support frame and the volume coil, and the second connecting component may be configured to connect the support frame with the volume coil.

In some embodiments, the connecting component may be an adjustable component, and the connecting component may be configured to adjust a radial distance between the support frame and the support cylinder; or the second connecting component may be an adjustable component, and the second connecting component may be configured to adjust a radial distance between the support frame and the volume coil.

In some embodiments, two ends of the volume coil may be provided with a connecting portion, respectively, and the connecting portion may protrude from an inner chamber of the support cylinder along an axial direction of the coil cylinder; and one end of the second connecting component may be connected with the connecting portion, and another end of the second connecting component may be connected with the support frame.

In some embodiments, an outer side of the support cylinder may be provided with a conductive material, and the conductive material may form a faraday cage.

In some embodiments, the support assembly may include a support frame and a plurality of support arms, the support frame and the plurality of support arms may be located outside of the volume coil, the plurality of support arms may be arranged at intervals around the volume coil, one end of each of the plurality of support arms may be connected with the support frame, and another end of each of the plurality of support arms may be connected with the detector.

In some embodiments, the support frame may include a cylindrical superconducting magnet, the superconducting magnet may be arranged around the volume coil, one end of each of the plurality of support arms may be connected with an inner wall of the cylindrical superconducting magnet, and another end of the each of the plurality of support arms may be connected with the detector.

In some embodiments, the support assembly may include a coil cylinder, the volume coil may surround an outer side of the coil cylinder, the coil cylinder may support the volume coil; the detector may be installed on an outer wall of the coil cylinder, and the detector may be located at radial outside of the coil cylinder relative to the volume coil.

In some embodiments, the imaging system may further include a shielding layer, the shielding layer may be installed on a radial outer side of the coil cylinder and arranged between the detector and the volume coil.

In some embodiments, the outer wall of the coil cylinder may be provided with at least one protruding structure, the at least one protruding structure may protrude towards the radial outer side of the coil cylinder, the volume coil may be installed on the outer wall of the coil cylinder, and the detector may be installed on a side of the at least one protruding structure away from the coil cylinder.

In some embodiments, the at least one protruding structure may include a first protrusion and a second protrusion, and the first protrusion and the second protrusion may be arranged at intervals along an axial direction of the coil cylinder.

In some embodiments, the volume coil and the shielding layer may be arranged between the first protrusion and the second protrusion; the detector may be provided with two connecting portions, the two connecting portions may be connected at both ends of the detector along the axial direction of the coil cylinder, respectively; the detector may be arranged between the first protrusion and the second protrusion, and the two connecting portions may be connected with the first protrusion and the second protrusion, respectively.

In some embodiments, the detector may be provided with a third protrusion, the third protrusion may protrude towards the radial outer side of the coil cylinder, and the third protrusion may be connected with the outer wall of the coil cylinder.

In some embodiments, the outer wall of the coil cylinder may be provided with a coil cylinder accommodating tank around the coil cylinder, the volume coil may be accommodated within the coil cylinder accommodating tank, and the shielding layer may cover the outer wall of the coil cylinder and seals a notch of the coil cylinder accommodating tank.

In some embodiments, the shielding layer may be connected with the detector, and the shielding layer may be installed on one side of the detector towards the volume coil.

In some embodiments, the detector may comprise a plurality of detector units, wherein each of the plurality of detector units extends along an axial direction of the coil cylinder, the plurality of detector units are arranged along the axial direction of the coil cylinder, an installation space is formed between a radial outer side of the coil cylinder and the plurality of detector units, and the volume coil is arranged within the installation space.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein:

FIG. 2 is a schematic diagram illustrating an exemplary structure of an imaging system according to some embodiments of the present disclosure;

FIG. 3A is a schematic diagram illustrating an exemplary structure of a support cylinder and a detector according to some embodiments of the present disclosure;

FIG. 3B is a schematic diagram illustrating an exemplary enlarged view of a portion I according to some embodiments of the present disclosure;

FIG. 4A is a schematic diagram illustrating an exemplary structure of another imaging system according to some embodiments of the present disclosure;

FIG. 4B is a schematic diagram illustrating an exemplary structure of another imaging system according to some embodiments of the present disclosure;

FIG. 5 is a schematic diagram illustrating an exemplary structure of a coil cylinder according to some embodiments of the present disclosure;

FIG. 6 is a schematic diagram illustrating an exemplary structure of a coil cylinder and a shielding layer according to some embodiments of the present disclosure;

FIG. 7 is a schematic diagram illustrating an exemplary structure of another imaging system according to some embodiments of the present disclosure;

Figure 1:
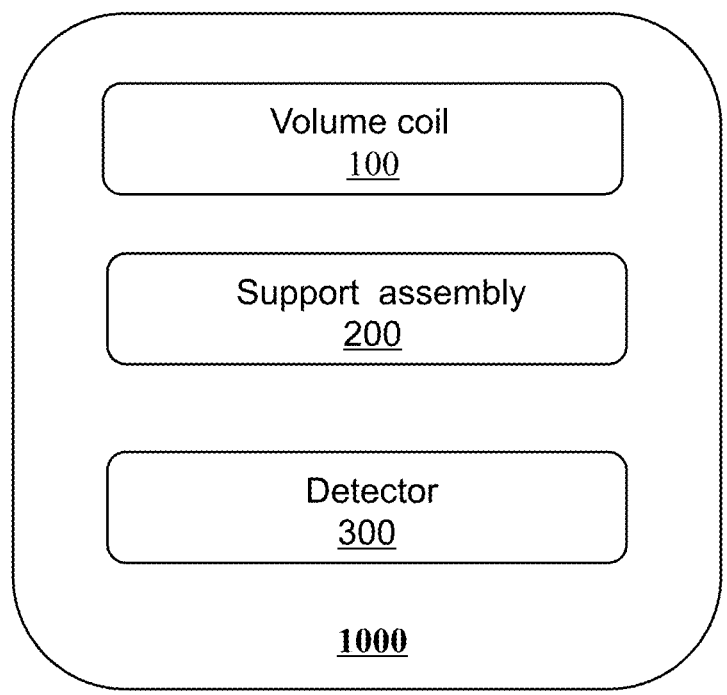
FIG. 1 is a schematic diagram illustrating exemplary modules of an imaging system according to some embodiments of the present disclosure.

100: volume coil; 110: end portion; 111: end portion sub-unit; 120: crossbar; 121: sub-crossbar; 200: support assembly; 210: support cylinder; 220: coil cylinder; 221: coil cylinder body; 222: protruding structure; 222-1: first protrusion; 222-2: second protrusion; 223: coil cylinder accommodating tank; 224: first connecting portion; 230: second support frame; 240: support arm; 300: detector; 310: second connecting portion; 320: third protrusion; 330: detector unit; 400: bed guide rail; 510: first fastening piece; 520: gasket; 600: radio frequency component; 710: first shielding layer; 720: second shielding layer; 721: shielding layer accommodating tank; 730: third shielding layer; 740: fourth shielding layer; 800: slot; 900: first support frame; 910: first connecting component; 920: second connecting component; and 1000: imaging system.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operation performed by the system according to the embodiment of the present disclosure. It should be understood that the preceding or subsequent operations are not necessarily performed accurately in sequence. Instead, the steps may be processed in reverse order or simultaneously. At the same time, other operations may add to these procedures, or remove one or more operations from these procedures.

FIG. 1 is a schematic diagram illustrating exemplary modules of an imaging system according to some embodiments of the present disclosure. As shown in FIG. 1, an imaging system 1000 may include a volume coil 100, a support assembly 200, and a detector 300. The volume coil 100 may be configured to surround an outer side of the support assembly 200 or the support assembly 200 may be configured to surround an outer side of the volume coil 100. A low dielectric constant region may be between the volume coil 100 and the detector 300, wherein the low dielectric constant region may be an air region or a vacuum region. By arranging the low dielectric constant region between the volume coil 100 and the detector 300, a propagation speed of the signal (e.g., an electrical signal emitted by the detector 300) may be improved, the signal attenuation may be improved, and thus the quality and reliability of signal transmission may be improved.

The volume coil 100 may be configured to emit electromagnetic waves to generate a radio frequency field, thereby exciting a nuclear spin inside a subject and generating a magnetic resonance signal. The volume coil 100 may be various forms of coil, such as a bird cage coil, an orthogonal coil, a saddle shaped coil, or the like.

The detector 300 may be configured to receive gamma photons generated by radionuclides in the subject. After receiving the gamma photons generated by the radionuclides in the subject, the detector 300 may convert an optical signal into an electrical signal by subsequent work modules. Based on the electrical signal according to the gamma photons counting, an image reconstruction may be performed by using a PET reconstruction algorithm to obtain a final PET image. In some embodiments, a count of the detector 300 may be one or more.

The detector 300 may be installed on the support assembly 200. The support assembly 200 may be configured to support the detector 300. In some embodiments, the support assembly 200 may also be e configured to support volume coil 100. In some embodiments, the support assembly 200 may include a cylindrical support structure. For example, the support assembly 200 may include a support cylinder 210 or a coil cylinder 220. More descriptions of the support cylinder 210 may be found in FIGS. 2-9 and related descriptions. More descriptions of the coil cylinder 220 may be found in FIGS. 12-21 and related descriptions. The cylindrical support structure may be made of insulating materials, such as fiberglass. In some embodiments, the support assembly 200 may also include other types of support structures. For example, the support assembly 200 may also include the support frame (also referred to as a second support frame 230) and a plurality of support arms 240. More descriptions of the second support frame 230 and the plurality of support arms 240 may be found in FIG. 11 and related descriptions.

In some embodiments, as shown in FIGS. 2-11, the support assembly 200 may surround the outer side of the volume coil 100. Alternatively, as shown in FIGS. 12-21 the volume coil 100 may surround the outer side of the support assembly 200.

Some embodiments of the present disclosure may achieve simultaneous PET imaging and MR imaging by integrating the detector 300 and the volume coil 100 into the imaging system 1000, thereby ensuring the convenience of examining the subject.

Following problems exist when the detector 300 and the volume coil 100 are integrated together: (1) there are many components to be assembled on a structure that is configured to support both the detector 300 and volume coil 100, resulting in a heavy imaging system; (2) when replacing the detector 300, the volume coil 100 needs to be removed at the same time, thereby the disassembly process is complex. The combination of the above two problems makes it difficult to disassemble the detector 300 and volume coil 100 when the detector 300 and volume coil 100 are integrated together.

Some embodiments of the present disclosure provide an imaging system 1000, the detector 300 may be arranged on the support assembly 200 independently. On one hand, by supporting the detector 300 and the volume coil 100 independently, a weight that a supporting structure of the detector 300 bears and a weight that a supporting structure of the volume coil 100 may be both reduced. On the other hand, by assembling a coil cylinder 220 and the detector 300 separately, it is not necessary to disassemble the volume coil 100 when disassembling the detector 300, or disassemble the detector 300 when disassembling the volume coil 100. Thus, it is convenient when repairing the imaging system 1000. In addition, in some embodiments, the detector 300 may be arranged inside the support assembly 200, thereby avoiding the attenuation of PET signals caused by the support assembly 200 and ensuring the working performance of the imaging system 1000.

In some embodiments, the imaging system 1000 may also include a superconducting magnet (not shown in the figures). The superconducting magnet may include an accommodating cavity. The imaging system 1000 described in any of the previous embodiments of the description may be arranged in the accommodating cavity.

It should be understood that the imaging system 1000 may also include a gradient coil, and the superconducting magnet and the gradient coil may form the accommodating cavity together. The superconducting magnet may be configured to generate a uniform and stable main magnetic field, magnetize a subject, and generate a macroscopic magnetization vector. The gradient coil may generate a spatially linear gradient magnetic field, resulting in different resonance frequencies of the subject at different positions in space, thus allowing signals at different positions in space to be distinguished. In addition, the imaging system 1000 may also include a spectrometer and a computer. The spectrometer, as a control center, may be configured to control a coordination among the superconducting magnet, the gradient coil, and a radio frequency component 600. The computer may be configured to process and synthesize image information received by the radio frequency component 600. More descriptions of the radio frequency component 600 may be found in FIG. 4A, FIG. 4B, and related descriptions.

The superconducting magnet may include a superconducting main coil, a superconducting shield coil, and a dewar. The superconducting main coil and superconducting shield coil may be wound with low-temperature superconducting wires, such as a NbTi wire. A large amount of refrigerant (e.g., liquid helium) may be stored in the dewar and provide a constant low-temperature superconducting environment for the entire superconducting magnet. The superconducting main coil and shielding coil may generate a uniform static magnetic field through the magnetic field effect of strong current.

Specifically, the gradient coil may be generally composed of three sets of gradient coils along x, y, and z directions, respectively, which may be configured to generate a gradient magnetic field with the same direction as a main magnetic field (B0 field) while the magnetic field strength varies linearly along the x, y, and z directions, respectively. A superposition of one or more gradient coils may generate a uniform gradient magnetic field.

It can be understood that the imaging system 1000 may also be equipped with other functional auxiliary components such as a water cooling system to improve the detection performance of the imaging system 1000.

FIG. 2 is a schematic diagram illustrating an exemplary structure of an imaging system 1000 according to some embodiments of the present disclosure.

In some embodiments, as shown in FIG. 2, the support assembly 200 may include a support cylinder 210. The support cylinder 210 may be configured to support the detector 300. The support cylinder 210 may be arranged to surround the outer side of the volume coil 100. The support cylinder 210 may be arranged to surround the outer side of the coil cylinder 220, and the inner side of the support cylinder 210 may be equipped with the detector 300. The detector 300 may be located between the support cylinder 210 and the volume coil 100.

The detector 300 may comprise one or more detector units 330. As shown in FIG. 2, the plurality of detector units 330 may be uniformly arranged along a circumferential direction of the support cylinder 210 on an inner surface of the support cylinder 210. Through this arrangement, the detector 300 may receive the gamma photons within 0-360° to image the subject, and the imaging effect may be relatively good.

FIG. 3A is a schematic diagram illustrating an exemplary structure of a support cylinder 210 and a detector 300 according to some embodiments of the present disclosure, and FIG. 3B is a schematic diagram illustrating an exemplary enlarged view of a portion I according to some embodiments of the present disclosure. As shown in FIGS. 3A and 3B, the support cylinder 210 and detector 300 may be connected through a first fastening piece 510. The first fastening piece 510 may be a bolt. The detector 300 may be fixed to the inner surface of the support cylinder 210 through the first fastening piece 510, and a gasket 520 may also be provided between the first fastening piece 510 and the detector 300. In other embodiments, the detector 300 may also be fixed to the support cylinder 210 through other means. For example, the detector 300 may also be directly bonded to the support cylinder 210. In some embodiments, the first fastening piece 510 may also be of other structures. For example, the first fastening piece 510 may also be a screw or a rivet, or the like.

In some embodiments, the volume coil 100 may include a radio frequency component 600.

The radio frequency component 600 may be configured to transmit or receive RF signals. The type of the radio frequency component 600 may be flexibly set according to the requirements of the imaging system 1000 for the RF signals to meet the working requirements of the imaging system 1000. For example, the radio frequency component 600 may be arranged as at least one of an electric dipole antenna, a transverse electromagnetic wave antenna, a ring antenna, or a birdcage antenna according to the working requirements of the imaging system 1000.

In some embodiments, the imaging system 1000 may include a coil cylinder 220. The radio frequency component 600 may be arranged on the coil cylinder 220.

On one hand, the coil cylinder 220 may provide a support for the radio frequency component 600. As shown in FIGS. 4A and 4B, the radio frequency component 600 may be arranged between the coil cylinder 220 and the detector 300. The radio frequency component 600 and detector 300 may simultaneously act on the subject. In some embodiments, as shown in FIG. 5, the radio frequency component 600 may be arranged on the outer side of the coil cylinder 220. In some embodiments, the radio frequency component 600 may also be arranged in other parts of the imaging system 1000. For example, the radio frequency component 600 may also be arranged on the inner side of the support cylinder 210 and the outer side of the detector 300.

On the other hand, the coil cylinder 220 may be used as an insulation between the volume coil 100 and the subject. The coil cylinder 220 may include an inner cylinder layer, an outer cylinder layer, and an insulation layer. The outer cylinder layer may be covered around an outer circumference direction of the inner cylinder layer, and the insulation layer may be located in a portion of a region between the inner cylinder layer and the outer cylinder layer. The inner cylinder layer may be wrapped with glass fiber filaments impregnated with epoxy resin adhesive. The insulation layer may be arranged on an outer surface of the inner cylinder layer by bonding. After arranging the insulation layer on the outer surface of the inner cylinder layer, the outer surface of the inner cylinder layer may be repeatedly wound with glass fiber filaments impregnated with the epoxy resin adhesive at a certain spiral angle. After the cylindrical structure formed by the glass fiber filaments wrapped on the inner cylinder layer is solidified, the outer cylinder layer wrapped on the inner cylinder layer may be formed.

The support cylinder 210 and the coil cylinder 220 may both be cylindrical or elliptical cylindrical. A diameter of the support cylinder 210 may be greater than a diameter of the coil cylinder 220. The outer side of the coil cylinder 220 may be arranged with the volume coil 100, and the inner side of the coil cylinder 220 may be an inspection aperture for accommodating the subject for inspection. In some embodiments, the coil cylinder 220 may also be a hollow structure with other shapes.

By surrounding the support cylinder 210 around the volume coil 100 in some embodiments of the present disclosure, the detector 300 may be arranged on the inner side of the support cylinder 210. On one hand, the count of components assembled on the coil cylinder 220 may be reduced, a total assembly weight of the coil cylinder 220 may be reduced, and the assembly of the coil cylinder 220 may be facilitated. On the other hand, by assembling the volume coil 100 and detector 300 separately, it is not necessary to disassemble the volume coil 100 when disassembling the detector 300, or the detector 300 when disassembling the volume coil 100, thus making the imaging system 1000 convenient for disassembly and assembly during maintenance. In addition, the detector 300 may be arranged on the inner side of the support cylinder 210 to avoid the attenuation of PET signals caused by the support cylinder 210 and ensure the working performance of the imaging system 1000.

In some embodiments, the imaging system 1000 may also include a shielding layer (also referred to as a first shielding layer 710). The first shielding layer 710 may be arranged between the radio frequency component 600 and the detector 300 to shield a signal interference between the detector 300 and the radio frequency component 600. As shown in FIGS. 4A and 6, the first shielding layer 710 may be arranged on the coil cylinder 220 and covered on a surface of the radio frequency component 600. As shown in FIG. 4B, the first shielding layer 710 may also be arranged on the support cylinder 210 and wrapped on the surface of the detector 300.

The material of the first shielding layer 710 may be metal. Further, the first shielding layer 710 may be a filmy structure or a reticular structure. For example, the first shielding layer 710 may be a complete conductive metal film such as a copper foil, an electroplated metal layer, a sprayed metal layer, a metal mesh, or the like. In the embodiment, the first shielding layer 710 may be a conductive metal film.

In some embodiments, as shown in FIGS. 4A and 4B, there may be a slot 800 between the first shielding layer 710 and the detector 300. In some embodiments, by setting the slot 800, the detector 300 may include a certain assembly slot. When disassembling the support cylinder 210 or the coil cylinder 220, an interference between the detector 300 and the components on the coil cylinder 220 (e.g., the first shielding layer 710) may be avoided, resulting in damage. On the other hand, a certain distance between the detector 300 and volume coil 100 may reduce the heating effect of the detector 300 and the volume coil 100 on each other when using the imaging system 1000. Thus, the heat dissipation efficiency of the detector 300 and the volume coil 100 may be improved, and the safety performance of the imaging system 1000 may be ensured.

In some implementations, a width L of the slot 800 may be 0.5 mm-10 mm. As used herein, the width of the slot 800 may refer to a distance between the first shielding layer 710 and the detector 300 in a radial direction of the support cylinder 210. On one hand, if the width L of the slot 800 is too large, a diameter of the support cylinder 210 may be increased, thereby increasing the volume and weight of the imaging system 1000. On the other hand, if the width L of the slot 800 is too small, the heating of detector 300 may easily affect the working performance and safety performance of the volume coil 100. By setting the slot 800 according to the range of width L mentioned above, which can ensure a compact structure of the imaging system 1000 and working safely, efficiently, and stably.

In some embodiments, an axis of the support cylinder 210 and an axis of the volume coil 100 may be roughly parallel. In some embodiments, the support cylinder 210 and the volume coil 100 may be substantially coaxial. By setting the support cylinder 210 and the volume coil 100 coaxial, i.e., the support cylinder 210 and the coil cylinder 220 are arranged coaxially, which may ensure that the support cylinder 210 and the volume coil 100 rotate coaxially around the subject, so that the detector 300 may uniformly receive the gamma photons generated by the radionuclides in the body of the subject. If the support cylinder 210 and the volume coil 100 are assembled together, the total weight of the support cylinder 210 and the volume coil 100 may be relatively heavy, which requires a relatively high product performance of the support assembly 200, resulting in high cost. At the same time, the increase of thickness of the support assembly 200 may cause attenuation of the PET signals.

In some embodiments, the support cylinder 210 and the volume coil 100 may be assembled independently. As used herein, "assembled independently" refers that the support cylinder 210 and the volume coil 100 are produced and installed independently without interfering with each other. By assembling the support cylinder 210 and the volume coil 100 independently in some embodiments of the present disclosure, the support cylinder 210 and the volume coil 100 may be disassembled separately, and the disassembly efficiency of the imaging system 1000 may be improved. At the same time, the support cylinder 210 and the volume coil 100 may be assembled separately, which may avoid the attenuation of PET signals by the support cylinder 210, thereby ensuring the working performance of the imaging system 1000.

In some embodiments, as shown in FIG. 7, the imaging system 1000 may also include a support frame (also referred to as a first support frame 900) located on an outer side of the support cylinder 210. The first support frame 900 may be configured to fix and support the support cylinder 210. The first support frame 900 may be a hollow cylindrical structure. The first support frame 900 may also be other hollow structures. For example, the first support frame 900 may also be a hollow prismatic structure. A connecting component (also referred to as a first connecting component 910) may be arranged between the first support frame 900 and the support cylinder 210. The first connecting component 910 may be configured to connect the first support frame 900 and the support cylinder 210 to fix a position of the first support frame 900. The first connecting component 910 may be various structures for connecting various components. For example, the first connecting component 910 may be a bolt, a screw, a rivet, or any one or combination thereof. A count and position of the first connecting component 910 (or the first connecting assemblies) may be set according to the structure of the imaging system 1000.

Figure 8:
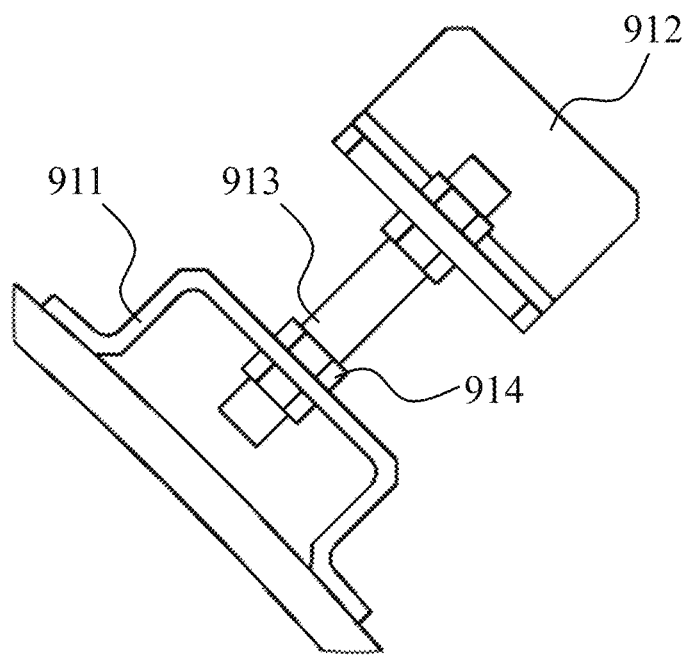
FIG. 8 is a schematic diagram illustrating an exemplary structure of a connecting component according to some embodiments of the present disclosure.

As shown in FIG. 8, the first connecting component 910 may include a first connecting piece 911, a second connecting piece 912, and a second fastening piece 913. The first connecting member 911 may be arranged on an outer side of the support cylinder 210, and the first connecting piece 911 may be provided with a first through hole (not shown in the figures). The second connecting piece 912 may be arranged on the first support frame 900, and the second connecting piece 912 may be provided with a second through hole (not shown in the figures). The second fastening piece 913 may be threaded into the first through hole and the second through hole, and may be configured to connect the first connecting piece 911 and the second connecting piece 912. The first connecting piece 911 may be welded to the outer side of the support cylinder 210, and the second connector 912 may be welded to the first support frame 900.

In some embodiments, as shown in FIG. 7, the imaging system 1000 may also include a second connecting component 920 arranged between the first support frame 900 and the coil cylinder 220. The second connecting component 920 may be configured to connect the first support frame 900 and the coil cylinder 220 to fix a position of the coil cylinder 220. Similar to the first connecting component 910, the second connecting component 920 may also be various structures for connecting various parts. More descriptions of the specific structure of the second connecting component 920 may be found in the related descriptions of the first connecting component 910 described above in the present disclosure.

Figure 9:
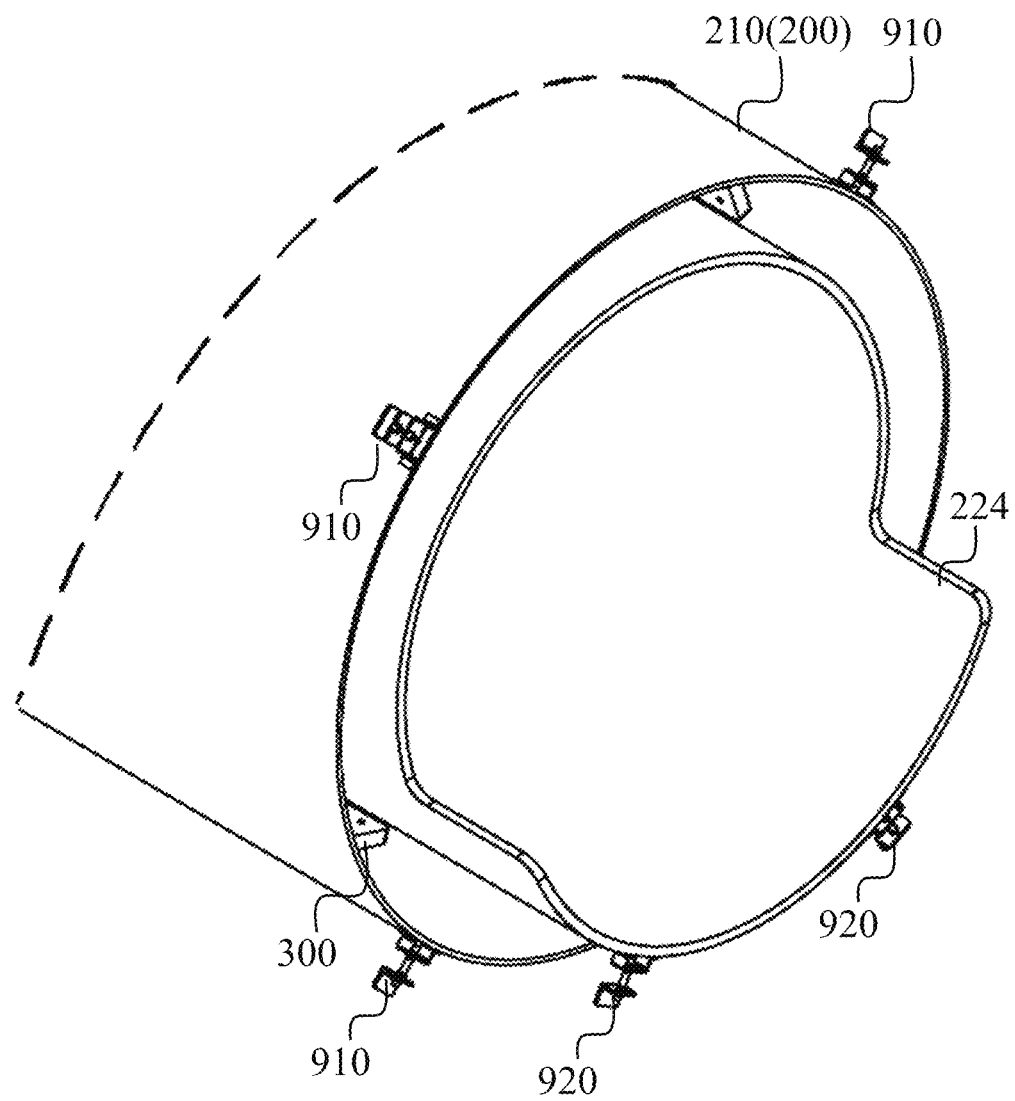
FIG. 9 is a schematic diagram illustrating an exemplary structure of a support cylinder, a connecting component, a second connecting component, and a coil cylinder according to some embodiments of the present disclosure.

In some embodiments, the second connecting component 920 may be connected with the first support frame 900 in various ways. For example, the support cylinder 210 may include at least one hollow position, and the second connecting component 920 may connect with the first support frame 900 by passing through a hollow position of the support cylinder 210. In some embodiments, as shown in FIG. 9, the two ends of the coil cylinder 220 have a connecting portion (also referred to as a first connecting portion 224), respectively, and the first connecting portion 224 may protrude from an inner cavity of the support cylinder 210 along an axial direction of the coil cylinder 220. One end of the second connecting component 920 may be connected with the first connection portion 224 of the coil cylinder 220, and another end may be connected with the first support frame 900. Through this connecting mode, the second connecting component 920 may keep away from the support cylinder 210 when connecting the support cylinder 210 and the coil cylinder 220, thus avoiding interference between the second connection component 920 and the support cylinder 210.

In some embodiments of the present disclosure, the support cylinder 210 and the coil cylinder 220 may be respectively fixed on the first support frame 900 through the first connecting component 910 and the second connecting component 920, which may facilitate the separate disassembly of the support cylinder 210 and the coil cylinder 220, and improve the disassembly efficiency of the imaging system 1000.

In some embodiments, the first connecting component 910 and/or the second connecting component 920 may also be adjustable elements. The first connecting component 910 may also be configured to adjust a radial distance between the first support frame 900 and the support cylinder 210, and the second connecting component 920 may also be configured to adjust a radial distance between the first support frame 900 and the volume coil 100. Taking the first connecting component 910 as an example, as shown in FIG. 8, the second fastening piece 913 may be a bolt, and the both ends of the bolt may be provided with external threads. The first connecting component 910 may also include a nut 914, and the both ends of the bolt may be connected with nuts 914. The two nuts 914 may secure the first connecting piece 911 to one end of the bolt, and two nuts 914 may secure the second connecting piece 912 to another end of the bolt. By adjusting the position of the nut 914, a distance between the first connecting piece 911 and the second connecting piece 912 may be adjusted, so as to adjust a radial distance between the first connecting component 910 and the support cylinder 210, thus realizing the adjustment of the radial distance between the first support frame 900 and the support cylinder 210.

In some embodiments of the present disclosure, by setting the first connecting component 910 and/or the second connecting component 920 as adjustable components, a distance between the first support frame 900 and the support cylinder 210 and a distance between the first support frame 900 and the coil cylinder 220 may be adjusted, and the position of the support cylinder 210 and the coil cylinder 220 may be adjusted, so as to improve the flexibility of each component setting in the imaging system 1000.

Figure 10:
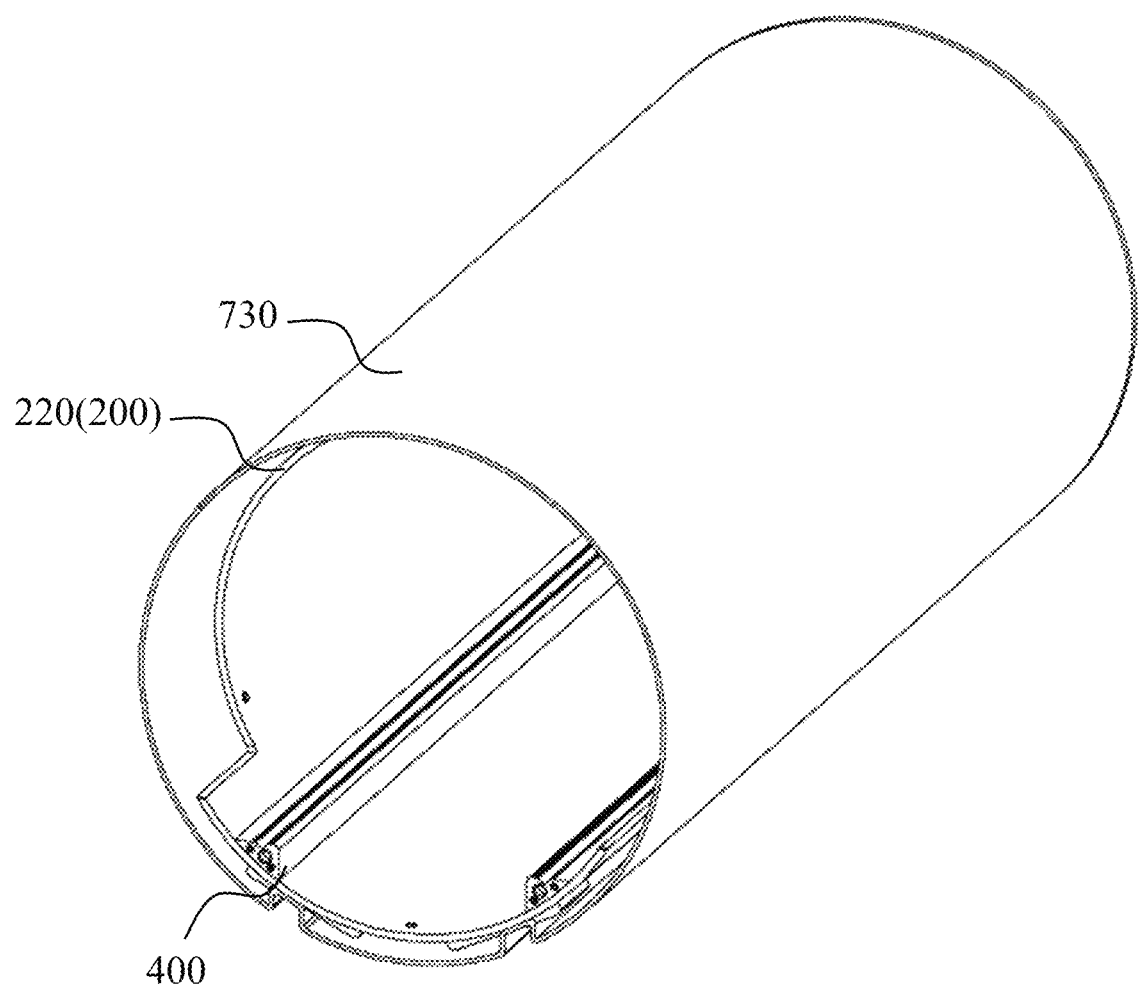
FIG. 10 is a schematic diagram illustrating an exemplary structure of a shielding layer, a volume coil, and a bed guide rail according to some embodiments of the present disclosure.

In some embodiments, as shown in FIG. 10, an outer side of the support cylinder 210 (not shown in the figures) may be provided with conductive material, which may form a Faraday cage. The conductive material may be a metal wire, a conductive cloth, or the like, and the metal wire may be a copper wire, a silver wire, an aluminum wire, or the like. The Faraday cage may be configured as the shielding layer (also referred to as a third shielding layer 730) for anti-interference, so that the imaging system 1000 has a good shielding effect. On one hand, the impact of electromagnetic fields on the imaging system 1000 may be avoided, and on the other hand, the impact of the imaging system 1000 on other devices may be avoided.

It should be noted that when existing magnetic resonance imaging devices are in use, in order to prevent interference signals in space from affecting image imaging, building a shielding room may be necessary. However, the construction cost of the shielding room is relatively high (e.g., the construction cost may be about US$50000) and the construction cycle is relatively long. On the other hand, a platform screen door of shielding room may be often used and may be prone to damage, resulting in high maintenance costs. On the other hand, site selection requirements for the construction of the shielding room may be relatively high, and the construction of two magnetic resonance devices may be considered not interfering with each other in the use. By setting a third shielding layer 730 on an outer side of the support cylinder 210 in some embodiments of the present disclosure, the installation of shielded rooms may be omitted, which not only saves space but also reduces the construction cost of the hospital.

In some embodiments, as shown in FIG. 10, an inner side of the coil cylinder 220 may be equipped with a bed guide rail 400, which may be configured to place a hospital bed. During the examination, the hospital bed may be slid out of the coil cylinder 220 along an axis of the coil cylinder 220, and the subject may be fixed on the bed in a lying posture. Then, the hospital bed may be slid into the coil cylinder 220 and scanned by the radio frequency component 600 and detector 300 to complete the examination process.

The imaging system 1000, by setting the detector 300 on the support cylinder 210, on one hand, the count of components assembled on the support assembly 200 may be reduced, a total assembly weight of the support assembly 200 may be reduced, and the assembly of the support assembly 200 may be facilitated. On the other hand, by assembling the coil cylinder 220 and detector 300 separately, the detector 300 may be disassembled without disassembling the coil cylinder 220 or the coil cylinder 220 may be disassembled without disassembling the detector 300, thus making the imaging system 1000 convenient for disassembly and assembly during maintenance. In addition, the detector 300 may be installed on an inner side of the support cylinder 210 to avoid attenuation of PET signals caused by the support cylinder 210, thereby ensuring the working performance of the imaging system 1000.

Some embodiments of the present disclosure may also provide an imaging system 1000. The support assembly 200 may include a second support frame 230 and multiple support arms 240. The detector 300 may be fixed on the second support frame 230 through multiple support arms 240, and the volume coil 100 and detector 300 may be assembled separately, thereby reducing the difficulty of disassembly and assembly of the imaging system 1000. At the same time, the second support frame 230 may also be act as a superconducting magnet, so that the second support frame 230 may act as a detector and generate a magnetic field simultaneously, which may reduce the volume of the imaging system 1000 and reduce the total weight of the imaging system 1000.

Figure 11:
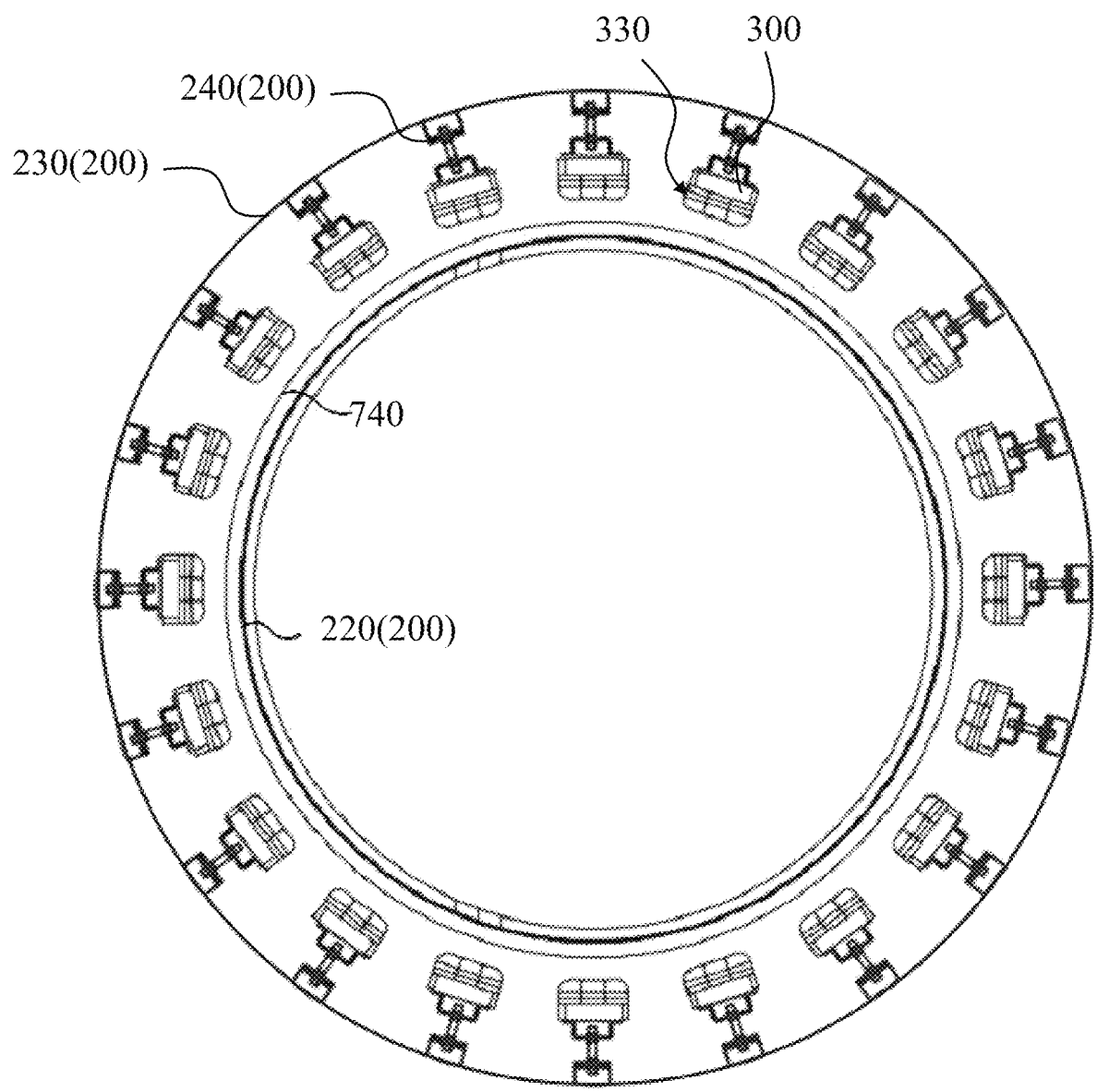
FIG. 11 is a schematic diagram illustrating an exemplary structure of another imaging system according to some embodiments of the present disclosure.

FIG. 11 is a schematic diagram illustrating an exemplary structure of another imaging system 1000 according to some embodiments of the present disclosure.

In some embodiments, the support assembly 200 may also include a second support frame 230 and a plurality of support arms 240. The second support frame 230 may be configured to support the support arms 240, and the support arms 240 may be configured to connect and fix the detector 300. The volume coil 100 may be installed on the coil cylinder 220. As shown in FIG. 11, the second support frame 230 and the plurality of support arms 240 may be both located outside the volume coil 100 and the coil cylinder 220. The plurality of support arms 240 may be arranged at intervals around the volume coil 100. One end of the support arm 240 may be connected with the second support frame 230, and another end of the support arm 240 may be connected with the detector 300. In some embodiments, the support arm 240 may be connected with one or more detectors 300. In some embodiments, the support arm 240 may include a third connecting piece (not shown in the figures), a fourth connecting piece (not shown in the figures), and a third fastening piece (not shown in the figures) similar to the structure of the first connecting component 910. The third connecting piece may be arranged on an inner side of the second support frame 230 (e.g., welded or bolted to the inner side of the second support frame 230), and the third connecting piece may be equipped with a third through hole (not shown in the figures). The fourth connecting piece may be installed on the detector 300 (e.g., welded or bolted to the inner side of the second support frame 230), and may be equipped with a fourth through hole (not shown in the figures). The third fastening piece may be threaded into the third through hole and the fourth through hole, and connected with the third connecting piece and fourth connecting piece.

In some embodiments, the support arm 240 may be retractable, and a distance between the detector 300 and the volume coil 100 may be adjusted by the extension and contraction of the support arm 240. In some embodiments, the support arm 240 may also be an adjustable component similar to the first connecting component 910. The third fastening piece may be a bolt with external threads at both ends, and the support arm 240 may further include two nuts. A distance between the detector 300 and the second support frame 230 may be adjusted through the bolt and nuts. More descriptions of the support arm 240 being the adjustable component may be found in FIG. 8 and the related descriptions of the first connecting component being the adjustable component.

In some embodiments, the imaging system 1000 may also include a third connecting component (not shown in the figures). One end of the third connecting component may be connected with the coil cylinder 220, and another end may be connected with the second support frame 230.

In some embodiments, the imaging system 1000 may also include the shielding layer (also referred to as a fourth shielding layer 740). The fourth shielding layer 740 may be arranged between the detector 300 and coil cylinder 220 to shield a signal interference between the volume coil 100 and detector 300. In some embodiments, the fourth shielding layer 740 may be wrapped outside the coil cylinder 220. In some embodiments, the fourth shielding layer 740 may also be wrapped outside the detector 300.

In some embodiments, the second support frame 230 may include a cylindrical superconducting magnet. The superconducting magnet may be arranged surround the volume coil 100. One end of the support arm 240 may be connected with an inner wall of the superconducting magnet, and another end may be connected with the detector 300. More descriptions of the superconducting magnet may be found in FIG. 1 and related descriptions.

In some embodiment of the present disclosure, by setting the second support frame 230, the detector 300 and the second support frame may be connected based on the support arm 240, to achieve separate assembly of the detector 300 and the coil cylinder 220, and ensure that the detector 300 may be disassembled without disassembling the coil cylinder 220 or the coil cylinder 220 may be disassembled without disassembling the detector 300, thereby making the disassembly and assembly of the imaging system 1000 convenient during maintenance. In addition, by arranging the detector 300 on the inner side of the second support frame 230, the attenuation of PET signals caused by the second support frame 230 may be avoided, which ensures the working performance of the imaging system 1000. In some embodiments, the second support frame 230 may be arranged as a superconducting structure, which may support the volume coil 100 and the detector 300 simultaneously and even the magnetic field without adding additional superconducting magnet, resulting in reducing the cost of the imaging system 1000 and improving the structural compactness of the imaging system 1000.

Figure 12:
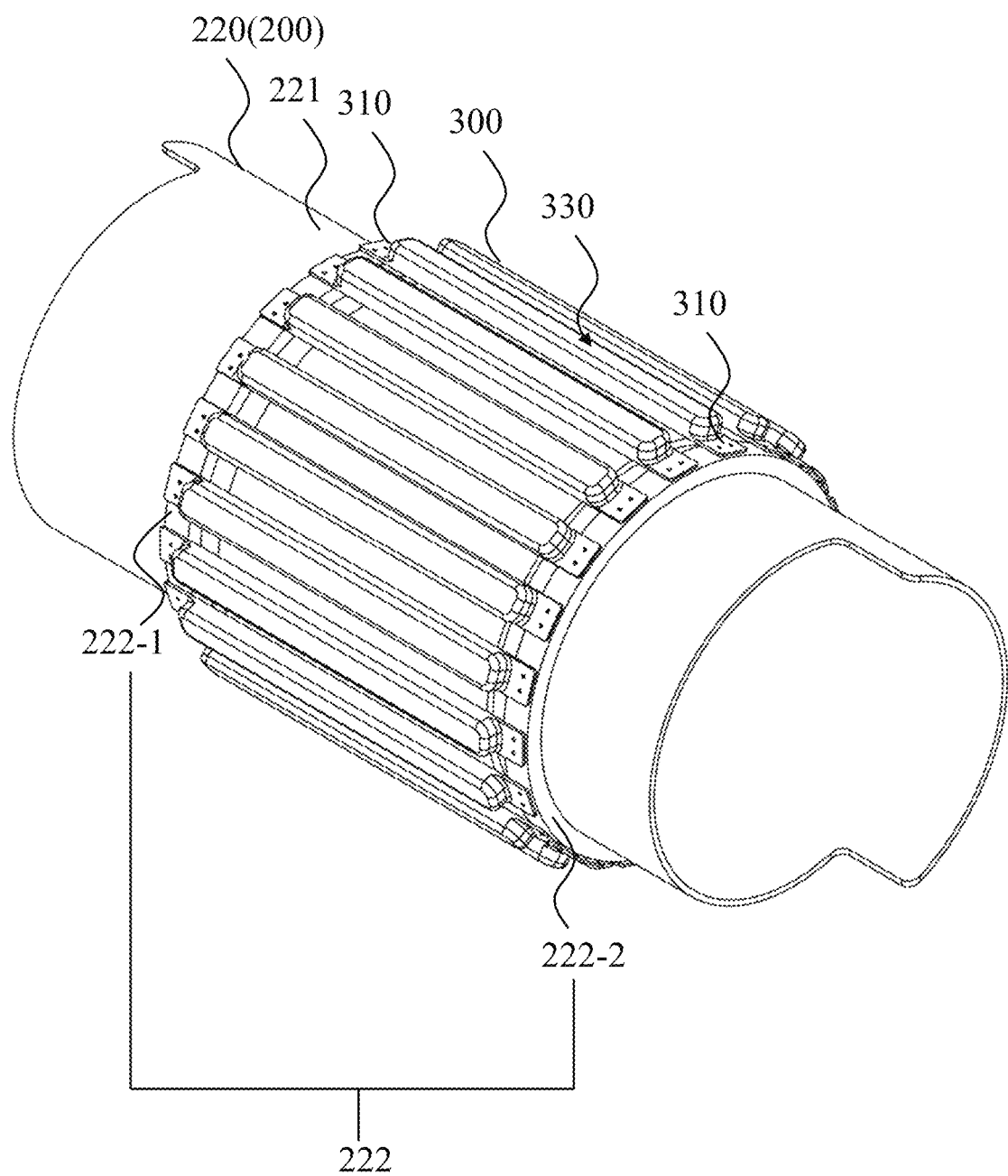
FIG. 12 is a schematic diagram illustrating an exemplary structure of another imaging system according to some embodiments of the present disclosure.

FIG. 12 is a schematic diagram illustrating an exemplary structure of another imaging system 1000 according to some embodiments of the present disclosure.

Figure 13:
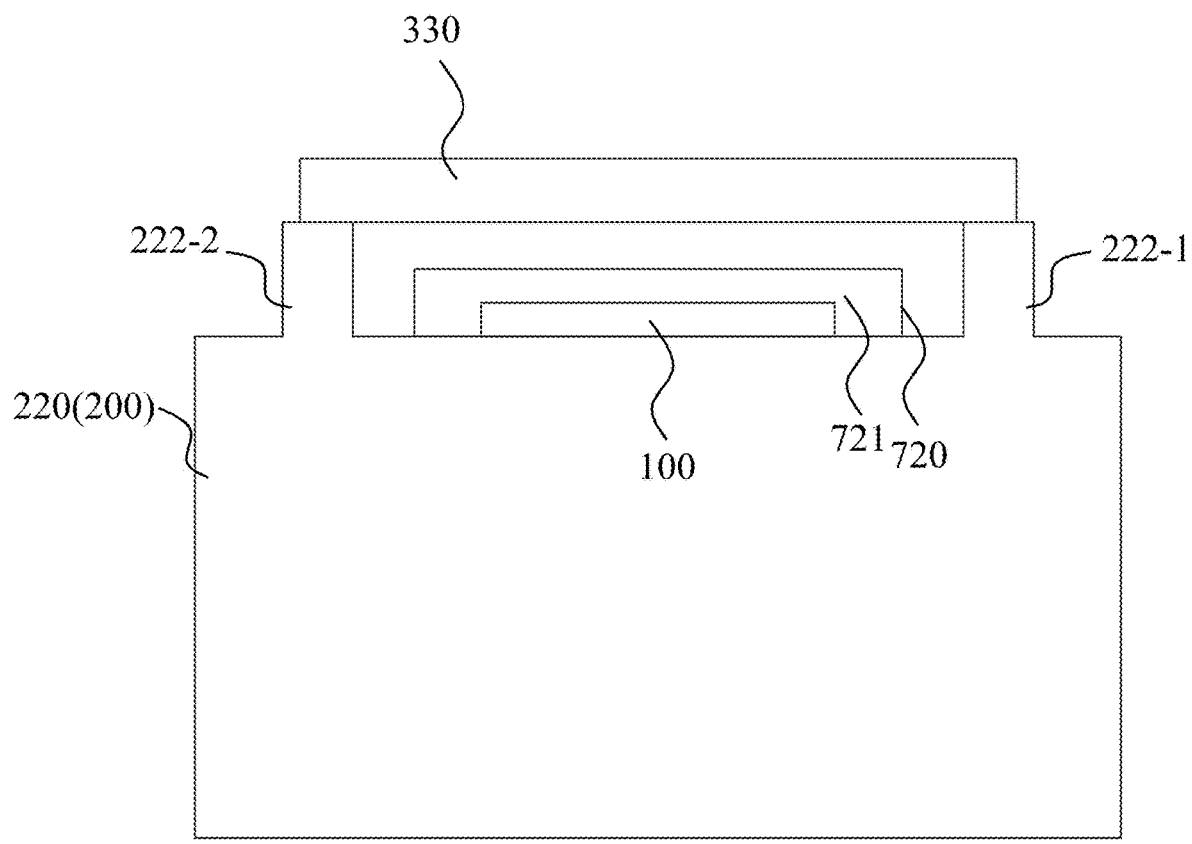
FIG. 13 is a schematic diagram illustrating an exemplary structure of a detector unit, a shielding layer, a volume coil, and a coil cylinder according to some embodiments of the present disclosure.
Figure 14:
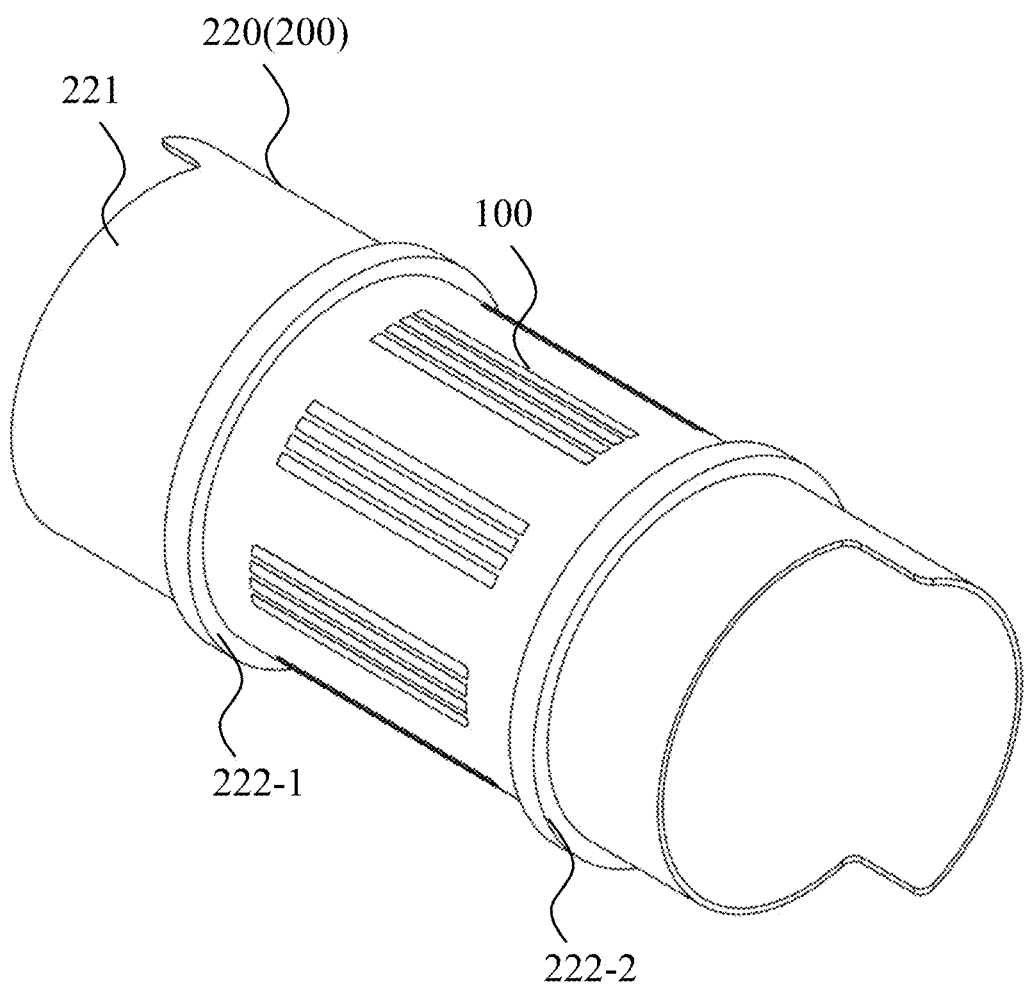
FIG. 14 is a schematic diagram illustrating an exemplary structure of a volume coil and a coil cylinder according to some embodiments of the present disclosure.

In other embodiments, the support assembly 200 may also include the coil cylinder 220. Both of the volume coil 100 and the detector 300 may be arranged on the coil cylinder 220. As shown in FIGS. 12-14, the volume coil 100 may be arranged surround the outer side of the coil cylinder 220, and the coil cylinder 220 may support the volume coil 100. The detector 300 may be installed on the outer side of the coil cylinder 220, and the detector 300 may be located on a radial outer side of the coil cylinder 220 relative to the volume coil 100.

In some embodiments of the present disclosure, by arranging the volume coil 100 and the detector 300 on the coil cylinder, the components configured to support the detector 300 separately may be avoided, and the cost may be reduced, making the imaging system 1000 compact in structure and relatively smaller in volume. In addition, the attenuation effect on PET rays may be reduced by allowing the PET rays to pass through at least one layer structure, thereby improving the imaging accuracy of the imaging system 1000.

In some embodiments, the detector 300 may include a plurality of detector units 330. Each of the plurality of detector units 330 may extend axially along the coil cylinder 220 and may be arranged circumferentially along the coil cylinder 220. The outer side of the coil cylinder 220 may form an installation space with the plurality of detector units 330, and the volume coil 100 may be arranged in the installation space.

In other alternative embodiments, the volume coil 100 may also be installed on a radial inner side of the coil cylinder 220. The volume coil 100 may also be installed on the radial inner side of the coil cylinder 220. The volume coil 100 in the embodiments may be installed on the radial outer side of the coil cylinder 220, which may fully utilize a radial outer space of the coil cylinder 220, making the internal space of the coil cylinder 220 large to ensure sufficient space for detecting the subject.

During the production and assembly process, the detector 300, the volume coil 100, and the coil cylinder 220 may be assembled and uniformly installed into the imaging system 1000. During the assembly process of the imaging system 1000, in order to reduce the damage to the detector 300 and other structures caused by collision, technicians may install an anti-collision structure (e.g., anti-collision foam) on the radial outer side of the coil cylinder 220, especially in areas prone to collision, and remove the anti-collision structure after installation.

In some embodiments, the imaging system 1000 may further include the shielding layer (also referred to as a second shielding layer 720). The second shielding layer 720 may be installed on the radial outer side of the coil cylinder 220 and between the detector 300 and the volume coil 100 to prevent a signal interference between the detector 300 and the volume coil 100. More descriptions of the specific arrangement of the second shielding layer 720 may be found in the following descriptions in the present disclosure.

In some embodiments, there may be a slot between the second shielding layer 720 and the detector 300 to prevent an interference between the detector 300 and the second shielding layer 720 during installation and use of the imaging system 1000, resulting in damage to the imaging system 1000. More descriptions of the slot between the second shielding layer 720 and the detector 300 may be found in the slot 800 between the first shielding layer 710 and the detector 300. In other alternative embodiments, the detector 300 and the second shielding layer 720 may not include an interval in a radial direction of the coil cylinder 220, i.e., the detector 300 may be abutted with the second shielding layer 720, thereby shortening a distance between the detector 300 and the volume coil 100, and making the overall structure of the imaging system 1000 more compact.

As shown in FIG. 12, the coil cylinder 220 may also include at least one protruding structure 222. The at least one protruding structure 222 may protrude radially on an outer side of the coil cylinder 220. The volume coil 100 may be installed on the outer side of the coil cylinder 220, and the detector 300 may be installed on a side of the at least one protruding structure 222 away from the coil cylinder 220. Specifically, the coil cylinder 220 may include a coil cylinder body 221 and at least one protruding structure 222. An upper end face of the coil cylinder body 221 may be a radial outer side face of the coil cylinder body 221, the at least one protruding structure 222 may extend upwards from the upper end face of the coil cylinder body 221, and an upper end face of the at least one protruding structure 222 may be a side of the at least one protruding structure 222 away from the coil cylinder body 221.

The at least one protruding structure 222 may support and fix the detector 300. Due to the at least one protruding structure 222 protruding upwards from the upper end face of the coil cylinder body 221, there is a radial distance between the upper end face of the at least one protruding structure 222 and the upper end face of the coil cylinder body 221 on the coil cylinder 220, i.e., there is a distance between a side face of the at least one protruding structure 222 far away from the coil cylinder body 221 and a radial outer side of the coil cylinder body 221, so that an installation space may be created between the detector 300 installed on the upper end face of the at least one protruding structure 222 and the volume coil 100 installed on the coil cylinder body 221, thereby facilitating the installation of the second shielding layer 720 in the installation space.

In addition, the at least one protruding structure 222 may be configured to position and limit the detector 300. On one hand, the installation efficiency of the detector 300 may be improved. On the other hand, an interference between the detector 300 and the volume coil 100 or the second shielding layer 720 may be prevented during the installation process.

As shown in FIG. 12, the at least one protruding structure 222 may be a strip structure surrounding the coil cylinder 220, which may be sleeved on the radial outer side of the coil cylinder body 221. In some embodiments, the at least one protruding structure 222 may be other structures. For example, the at least one protruding structure 222 may also be a segmented protruding structure surrounding the coil cylinder 220. The segmented protruding structure may only include a protrusion in a corresponding part of the detector 300 installed.

As shown in FIG. 12 and FIG. 14, the at least one protruding structure 222 may include a first protrusion 222-1 and a second protrusion 222-2. The first protrusion 222-1 and the second protrusion 222-2 may be arranged at intervals axially along the coil cylinder 220. The first protrusion 222-1 and the second protrusion 222-2 may be located at both ends of the detector 300 along an axial direction of the coil cylinder 220, respectively, to improve the stability of the detector 300 after installation.

As shown in FIG. 13, the volume coil 100 and the second shielding layer 720 may be arranged between the first protrusion 222-1 and the second protrusion 222-2. Specifically, there may be an interval between the first protrusion 222-1 and the second protrusion 222-2 in the axial direction of the coil cylinder 220, and the volume coil 100 and the second shielding layer 720 may be arranged within the interval. On one hand, due to the first protrusion 222-1 and the second protrusion 222-2 being located near axial ends of the coil cylinder body 221, an interval between the first protrusion 222-1 and the second protrusion 222-2 may be relatively large, thereby providing sufficient space for installation. On the other hand, the first protrusion 222-1 and the second protrusion 222-2 may divide the coil cylinder body 221 into three sections in the axial direction of the coil cylinder 220, and the volume coil 100 and the second shielding layer 720 may be installed in one section, which may improve installation efficiency.

As shown in FIG. 12, the detector 300 may be arranged with two connecting portions (also referred to as second connecting portion 310), the two second connecting portions 310 may be connected with both ends of the detector 300 along the axial direction of the coil cylinder 220. The detector 300 may be arranged between the first protrusion 222-1 and the second protrusion 222-2, and the two second connecting portions 310 may be connected with the first protrusion 222-1 and the second protrusion 222-2 to install and fix the detector 300. The two second connecting portions 310, the first protrusion 222-1, and the second protrusion 222-2 in some embodiments may be connected through threads, and the fastening piece may pass through corresponding threaded holes on the two second connecting portions 310, the first protrusion 222-1, and the second protrusion 222-2 to achieve the connection between the two second connecting portions 310, the first protrusion 222-1, and the second protrusion 222-2. In other alternative embodiments, the two second connecting portions 310, the first protrusion 222-1, and the second protrusion 222-2 may use other connection manners to achieve the connection.

Figure 15:
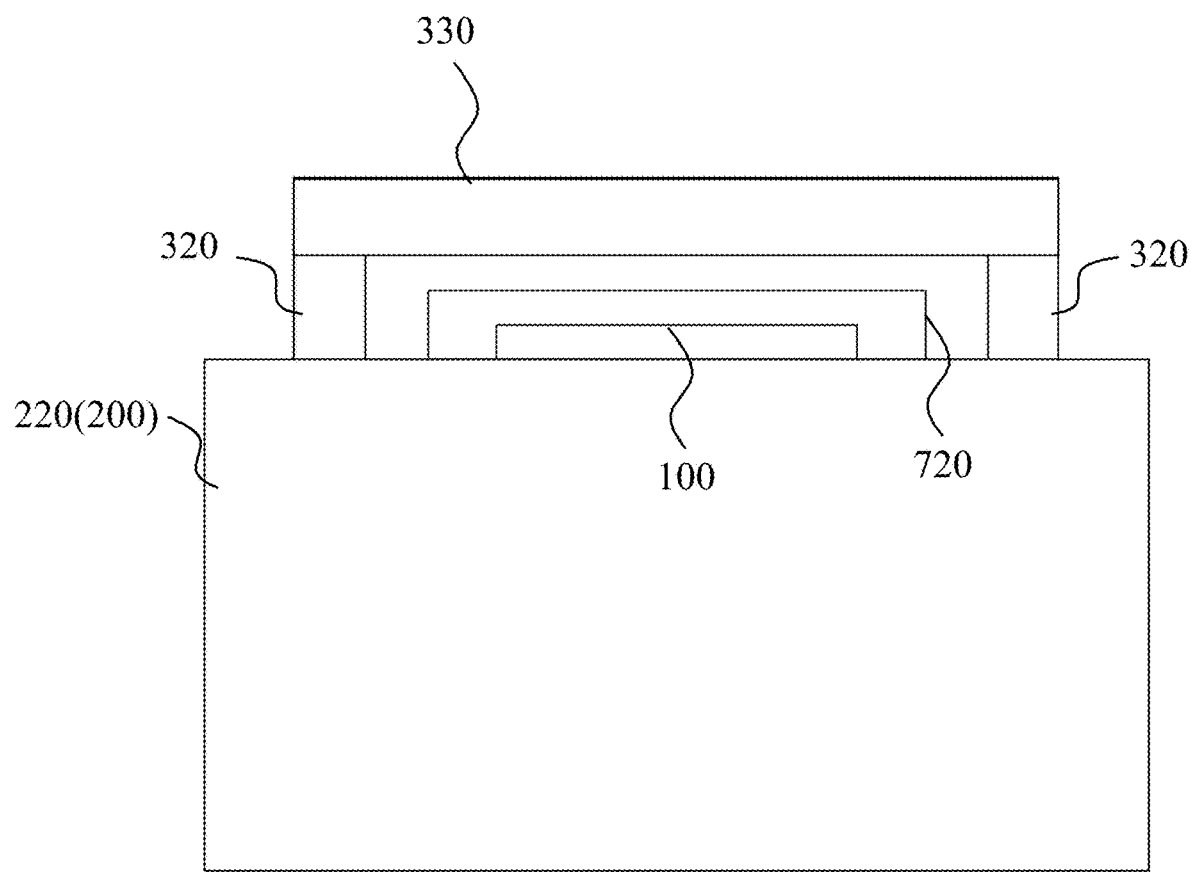
FIG. 15 is a schematic diagram illustrating another exemplary structure of a detector unit, a shielding layer, a volume coil, and a coil cylinder according to some embodiments of the present disclosure.

In some embodiments, the detector 300 may be arranged with a third protrusion 320. As shown in FIG. 15, the third protrusion 320 may protrude radially towards the outer side of the coil cylinder 220, and the third protrusion 320 may be connected (e.g., adhesion, welding, etc.) with the outer side of the coil cylinder 220, thereby forming an installation space. The second shielding layer 720 and volume coil 100 may be installed in the installation space.

The second shielding layer 720 may be wrapped outside the volume coil 100.

Figure 16:
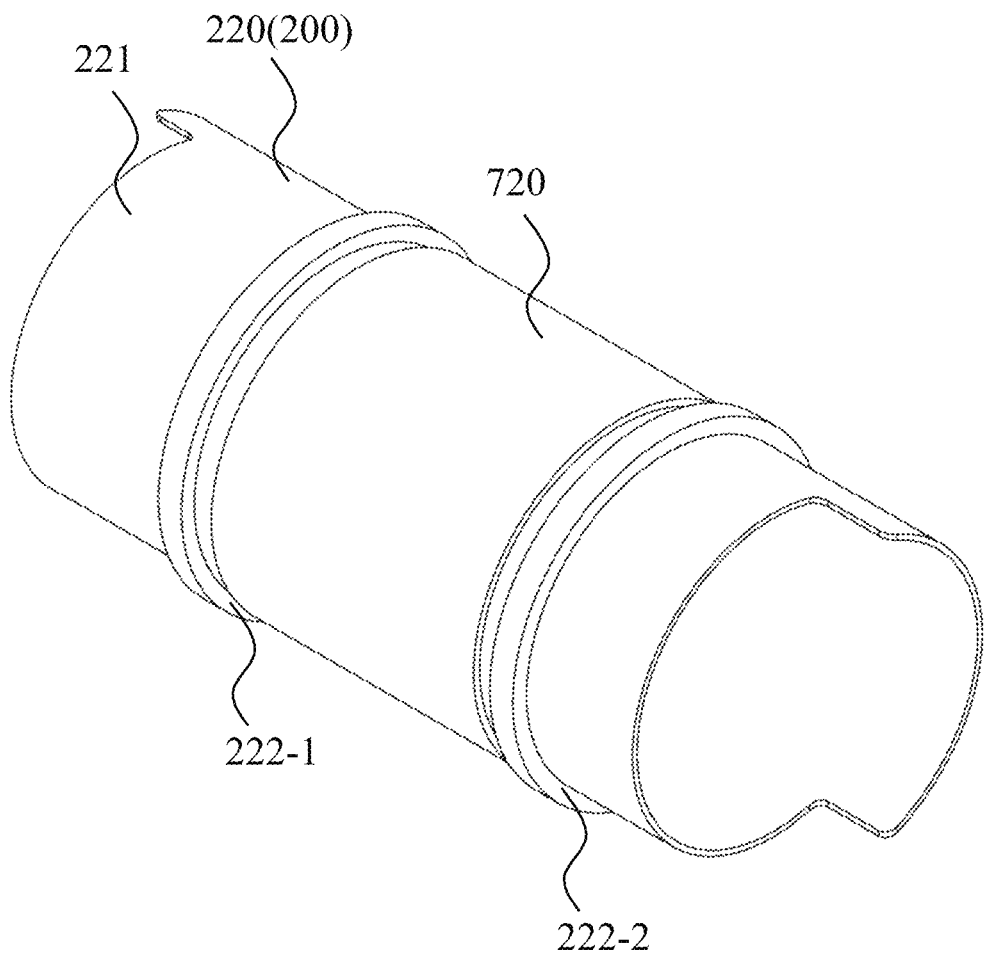
FIG. 16 is a schematic diagram illustrating another exemplary structure of a shielding layer and a coil cylinder according to some embodiments of the present disclosure.

In some embodiments, the second shielding layer 720 may include a shielding layer accommodating tank 721. As shown in FIG. 13, the second shielding layer 720 may include a shielding layer accommodating tank 721 with an opening facing downwards, a tank bottom of the shielding layer accommodating tank 721, two sides of the shielding layer accommodating tank 721, and the radial outer side of the coil cylinder body 221 may form an enclosed space, the volume coil 100 may be arranged in the enclosed space to isolate from the detector 300, which ensures that the second shielding layer 720 may fully cover the volume coil 100, thereby preventing the interference between the second shielding layer 720 and the volume coil 100, and facilitating installation. As shown in FIG. 16, the second shielding layer 720 in this embodiment may be a circular structure, arranged around the outer side of the volume coil 100 along a circumferential direction of the coil cylinder 220. The second shielding layer 720 may be fixed to the coil cylinder 220 through various means (e.g., bonding). The second shielding layer 720 may cover the volume coil 100 completely to isolate the detector 300 and the volume coil 100, thereby reducing the coupling between the detector 300 and the volume coil 100, and improving the imaging accuracy of PET.

Figure 17:
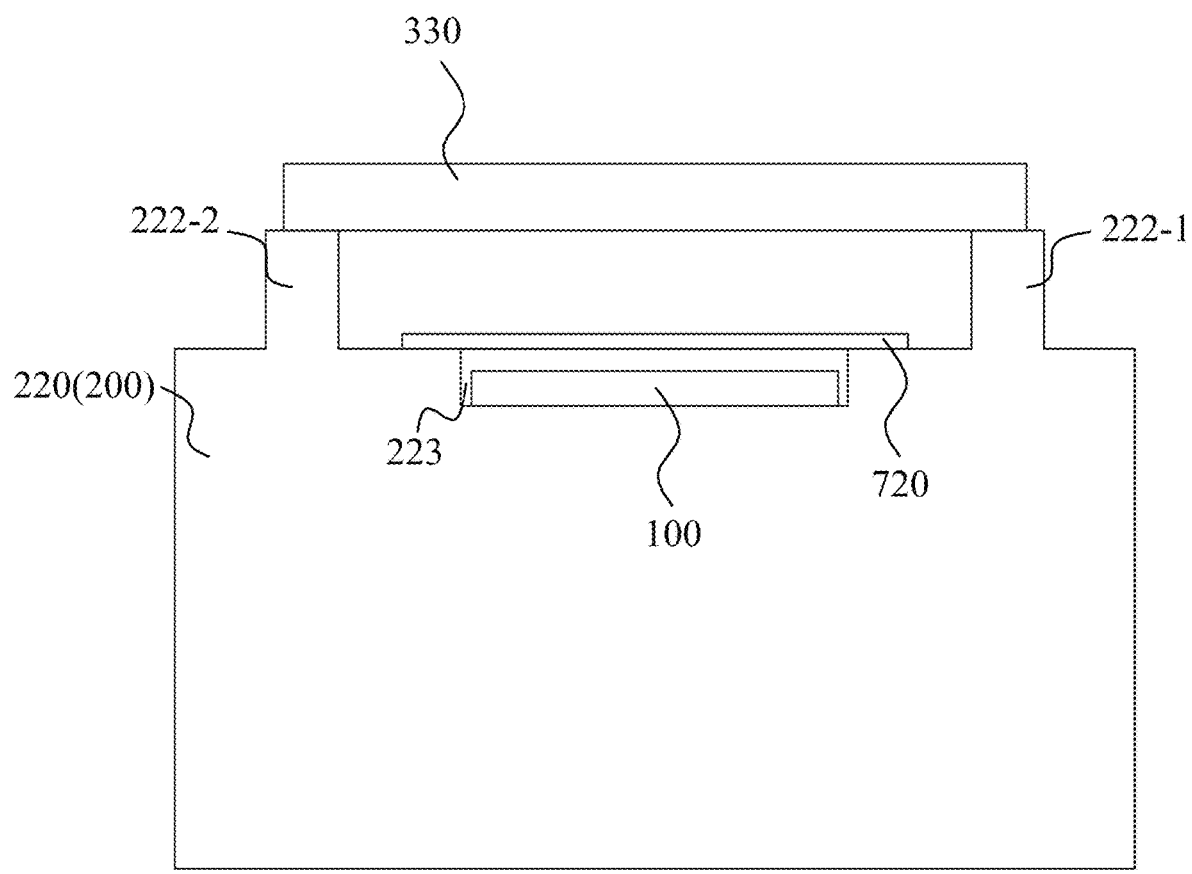
FIG. 17 is a schematic diagram illustrating another exemplary structure of a detector unit, a shielding layer, a volume coil, and a coil cylinder according to some embodiments of the present disclosure.

In some embodiments, the outer side of the coil cylinder 220 may be provided with a coil cylinder accommodating tank 223 surrounding the coil cylinder 220. As shown in FIG. 17, The coil cylinder accommodating tank 223 may be recessed from the radial outer side of the coil cylinder body 221 towards the radial inner side of the coil cylinder 220, the volume coil 100 may be accommodated in the coil cylinder accommodating tank 223. The second shielding layer 720 may cover the outer side of the coil cylinder 220 and seal a notch of the coil cylinder accommodating tank 223. In this embodiment, the volume coil 100 may be all accommodated in the coil cylinder accommodating tank 223, which may reduce a space occupied by the volume coil 100 on the radial outer side of the coil cylinder 220, thereby making the overall structure of the detector 300, the volume coil 100, and coil cylinder 220 compact, reducing the volume of imaging system 1000, and effectively preventing the interference between the detector 300 and the volume coil 100. This embodiment may adopt a surface mounted on the second shielding layer 720, which may be a flexible flat plate structure, etc., the second shielding layer 720 may cover the radial outer side of the coil cylinder 220 and seal a notch of the coil cylinder accommodating tank 270. The second shielding layer 720 may be installed on the radial outer side of the coil cylinder 220 by bonding and other means, which may shorten a distance between the detector 300 and the volume coil 100, thereby making the overall structure more compact.

Figure 18:
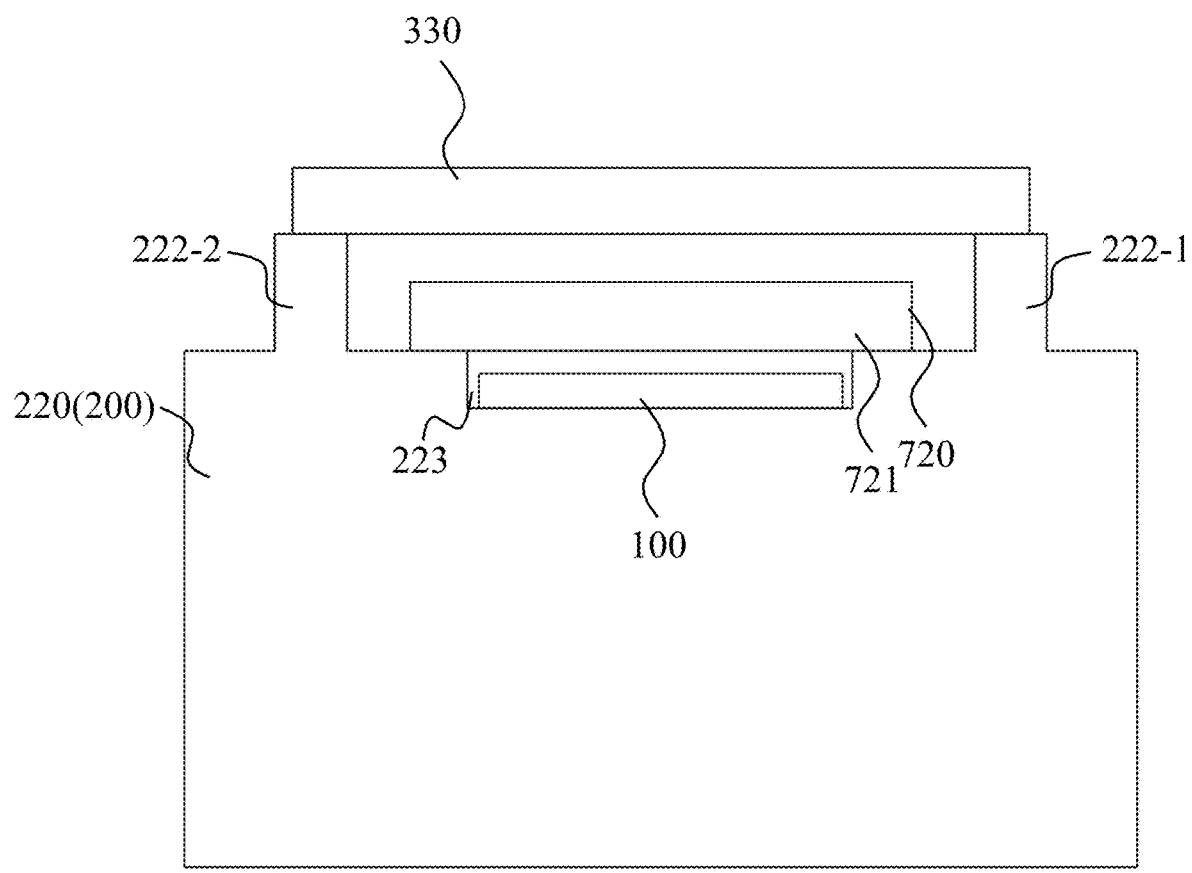
FIG. 18 is a schematic diagram illustrating another exemplary structure of a detector unit, a shielding layer, a volume coil, and a coil cylinder according to some embodiments of the present disclosure.

As shown in FIG. 13, FIG. 15, and FIG. 17, the imaging system 1000 may include a shielding layer accommodating tank 721 or a coil cylinder accommodating tank 223. As shown in FIG. 18, the imaging system 1000 may also include both a shielding layer accommodating tank 721 and a coil cylinder accommodating tank 223.

Figure 19:
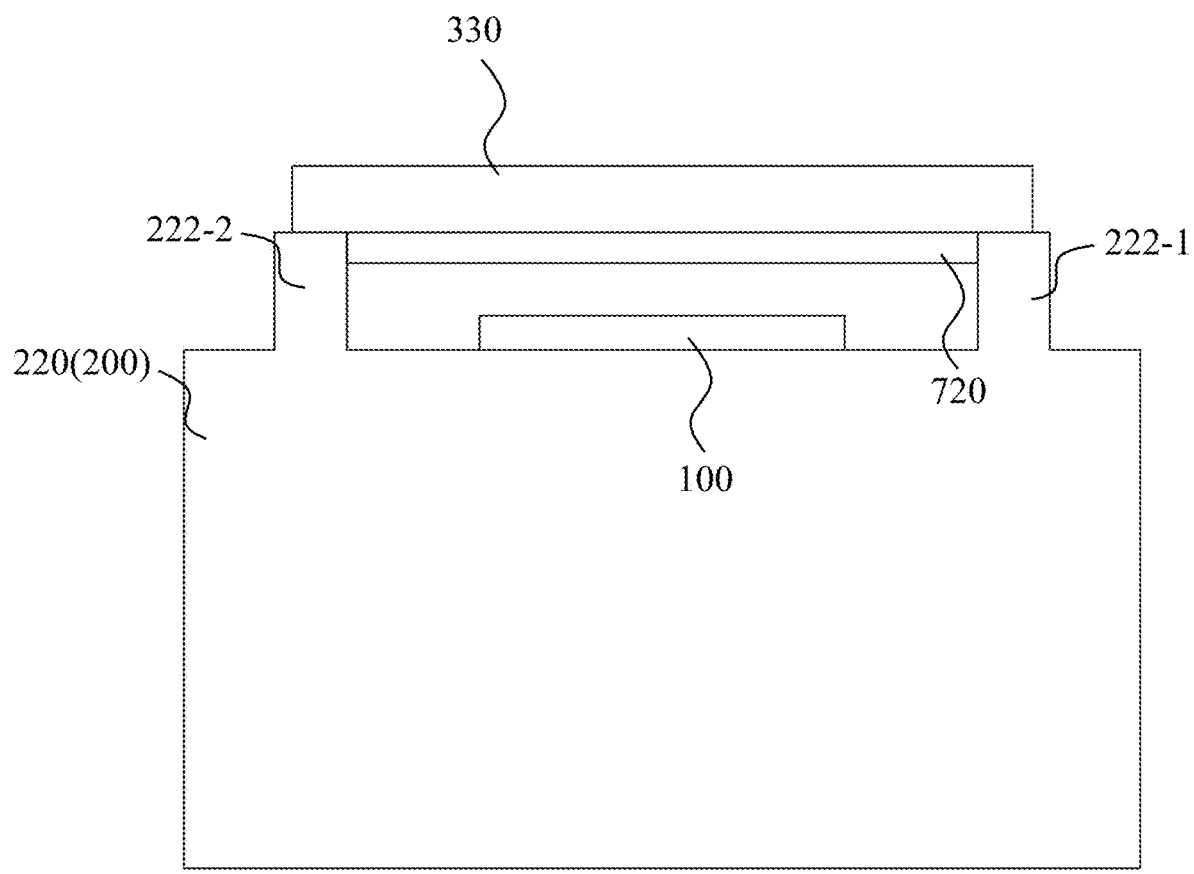
FIG. 19 is a schematic diagram illustrating another exemplary structure of a detector unit, a shielding layer, a volume coil, and a coil cylinder according to some embodiments of the present disclosure.

In some embodiments, the second shielding layer 720 may also be connected with the detector 300. The second shielding layer 720 may be installed on one side of the detector 300 facing the volume coil 100. As shown in FIG. 19, an upper end of the second shielding layer 720 may be abutted with a lower end of the detector 300, left and right ends of the second shielding layer 720 may be abutted with the first protrusion 222-1 and the second protrusion 222-2, respectively. The second shielding layer 720 may be installed and fixed relative to the coil cylinder 220 through the detector 300 and the at least one protruding structure 222. A lower end face of the second shielding layer 720, the first protrusion 222-1, an opposite side of the second protrusion 222-2, and the radial outward side of the coil cylinder body 221 may jointly form an installation space, and the volume coil 100 may be accommodated within the installation space.

Figure 20:
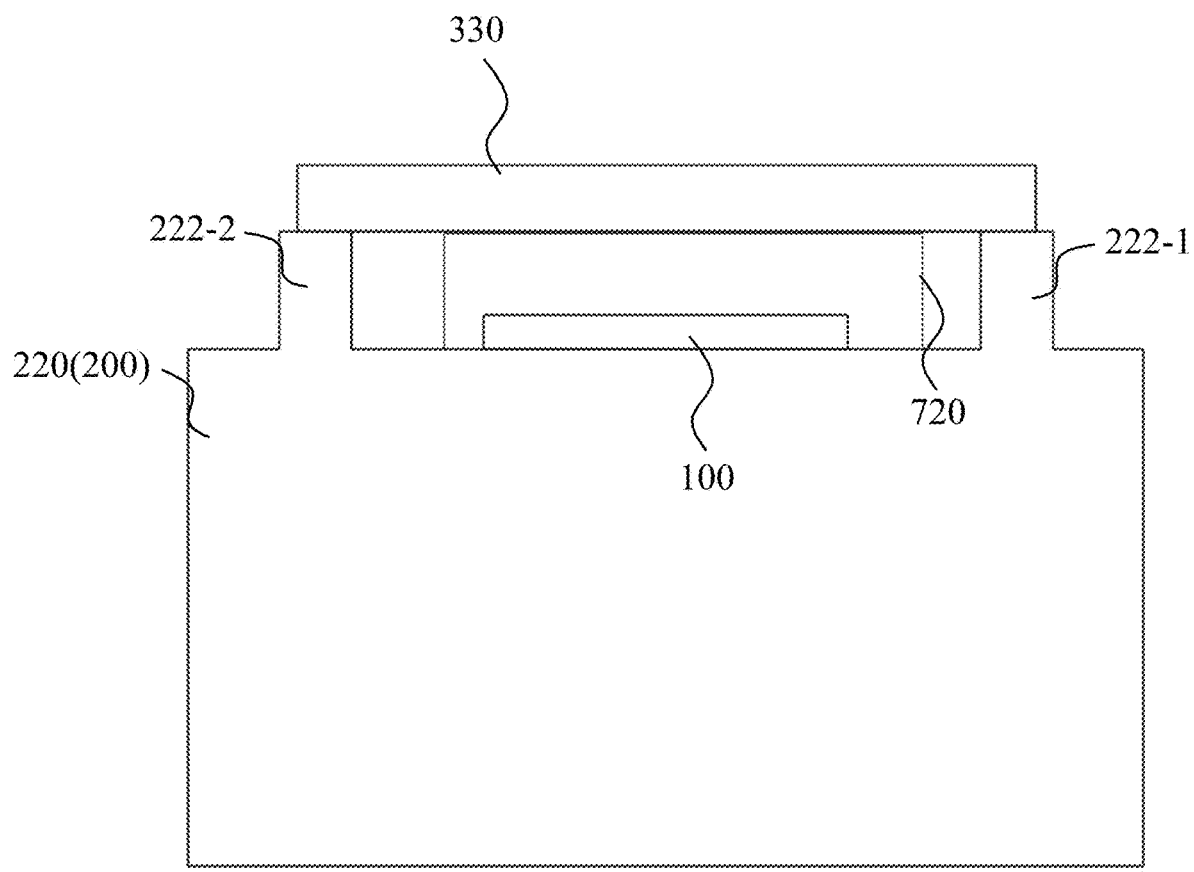
FIG. 20 is a schematic diagram illustrating another exemplary structure of a detector unit, a shielding layer, a volume coil, and a coil cylinder according to some embodiments of the present disclosure.

In some embodiments, as shown in FIG. 20, the second shielding layer 720 may be connected with the detector 300, and the second shielding layer 720 may be installed on one side of the detector 300 facing the volume coil 100. Specifically, based on an orientation shown in FIG. 20, a lower end of the second shielding layer 720 may be abutted with the radial outer side of the coil cylinder body 221, the upper end of the second shielding layer 720 may be abutted with the lower end of the detector 300, the detector 300 may be arranged outside the upper end of the second shielding layer 720, and the volume coil 100 may be arranged inside the upper end of the second shielding layer 720, which may shorten the distance between detector 300 and the second shielding layer 720, thereby making the overall structure compact.

When the detector 300 is assembled independently, the support assembly 200 needs to meet the following requirements: firstly, the weight of the detector 300 may be supported; secondly, after loading the detector, the support assembly 200 has a very small deformation may be ensured, which may satisfy the imaging requirements of the detector 300; thirdly, during the PET imaging, due to the rays directly pass through the support assembly 200, the support assembly 200 has good transmission ability for the PET rays. It is very difficult to find materials that meet the above requirements for the support assembly 200, either with high molding requirements or high cost.

The detector 300 may install the detector 300 directly on the support cylinder that is originally configured for supporting the support cylinder of the volume coil, while meeting the imaging requirements of the detector 300, a separate support structure designed to support the detector 300 may be no longer necessary to manufacture, which may reduce costs and make the overall structure of the detector 300, the volume coil 100, and the support cylinder more compact, resulting in saving the space. In addition, no dedicated support structure is set up to support the detector 300, which can enable the PET rays to pass through at least one layer structure, and reduce the attenuation effect on the PET rays, thereby improving the imaging accuracy of PET.

Moreover, the manufacturing of the support cylinder is simple and has low process requirements.

Figure 21:
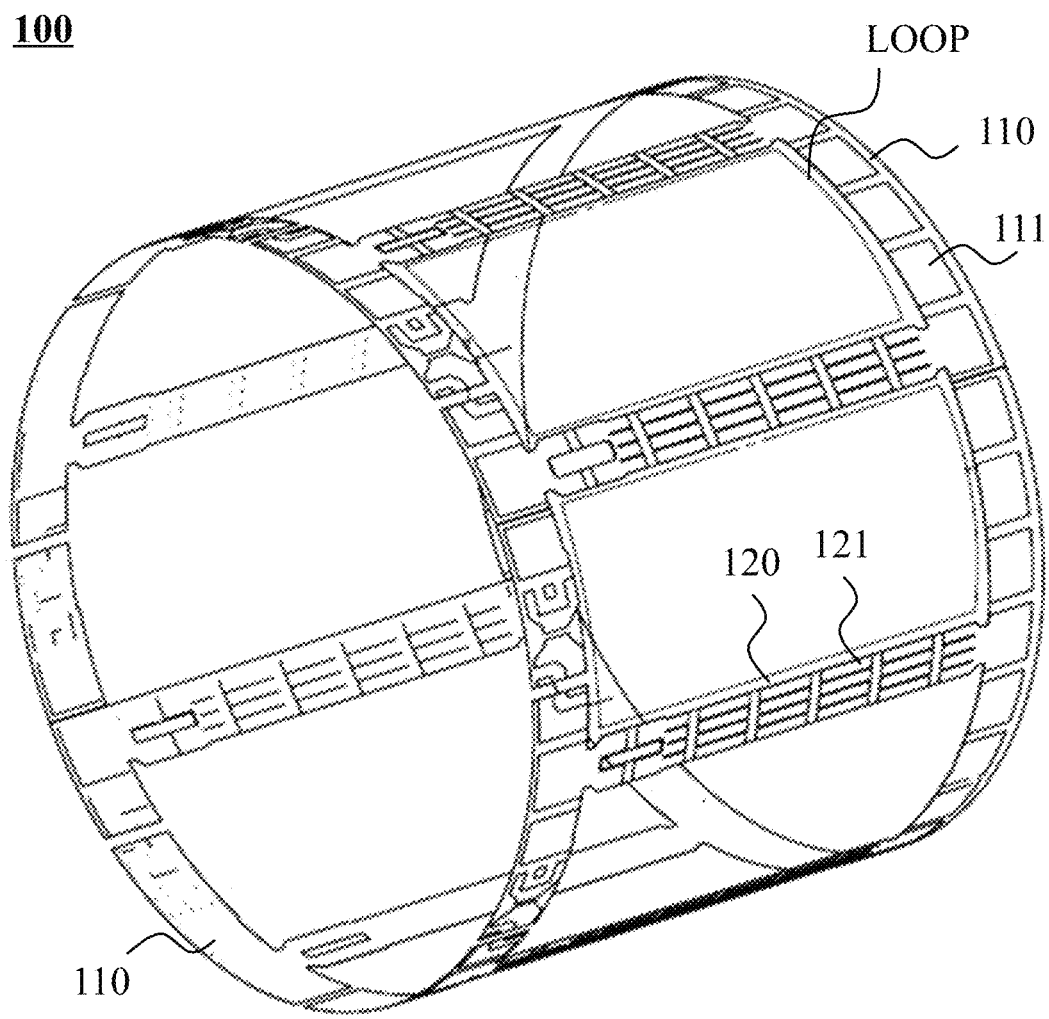
FIG. 21 is a schematic diagram illustrating an exemplary structure of a volume coil according to some embodiments of the present disclosure.

FIG. 21 is a schematic diagram illustrating an exemplary structure of a volume coil 100 according to some embodiments of the present disclosure.

As shown in FIGS. 13, 15, and 17-21, the radial outer side of the coil cylinder 220 and each detector unit 330 may form an installation space, and the volume coil 100 may be arranged in the installation space. The volume coil 100 may include at least two opposite end portions 110 and a plurality of crossbars 120 arranged between the two end portions 110. The end portion 110 may be arranged at both ends of the crossbar 120 and arranged at both ends between adjacent crossbars 120. The two end portions 110 may be matched with the plurality of crossbars 120 to form a first circular body, and an axial length of the first circular body may be smaller than a length of the detector unit 330.

As shown in FIG. 21, a count of end portions 110 of the volume coil 100 may be two, and a count of crossbars 120 may be more than one. The crossbar 120 may be arranged with a cross end antenna, and the end portion 110 may be arranged with an end ring antenna. The two end portions 110 may be arranged at both ends of the plurality of crossbars 120 and at both ends between adjacent crossbars 120, respectively. The crossbar 120 may be connected with the end portion 110 arranged on the two ends of the crossbar 120. The plurality of crossbars 120 may be arranged at circumferential intervals (preferably evenly spaced) along the volume coil 100. The crossbar 120 may extend along the axial direction of the volume coil 100. The crossbar 120 may include a plurality of sub-crossbars 121 arranged adjacent to each other along the axial direction of the volume coil 100, and the adjacent two sub-crossbars 121 may be connected through a capacitor. Typically, the two adjacent sub-crossbars 121 arranged in the middle of the crossbar 120 may be connected through a fixed capacitor. The two sub-crossbars 121 near the end portion 110 on the crossbar 120 or the sub-crossbar 121 that is configured to connect with the end portion 110 on the crossbar 120 may be connected through an adjustable capacitor (i.e., a capacitance value of the capacitor may be adjustable). By this arrangement, the error of each fixed capacitor may be adjusted through an adjustable capacitor, thereby accurately calibrating an emission frequency of the volume coil 100. In addition, each end portion 110 may include a plurality of end portion sub-units 111, which are arranged at intervals along a circumference direction of the volume coil 100 to form a circular end portion 110. The adjacent two crossbars 120, along with the plurality of end portion sub-units 111 arranged between the two crossbars, may form a loop. Therefore, the volume coil 100 may include a plurality of loops arranged along the circumferential direction, and the count of loops may be equal to the count of crossbars 120 of the volume coil 100. Further, a count of feeding ports in the volume coil 100 shown in FIG. 20 may be equal to the count of loops, i.e., a feeding port may act on a loop, alternatively, positions of the feeding port may be arranged on the end portion 110, and the plurality of feeding ports may be arranged at intervals along the circumference direction of the volume coil 100 on the same end portion 110, i.e., the feeding ports may be arranged on the end portion sub-unit 111.

Further, the adjacent two sub-crossbars 121 may be connected through the fixed capacitor or the adjustable capacitor, considering that the position accuracy between each loop may be different when the volume coil 100 is installed on the coil cylinder 220 and the fixed capacitance connected between sub-crossbar 121 exists a deviation. Preferably, the two sub-crossbars 121 may be connected through the adjustable capacitor to achieve the adjustment of different loop resonance frequencies, thereby achieving precise resonance frequency adjustment of the volume coil 100.

The basic concepts have been described. Obviously, for those skilled in the art, the detailed disclosure may be only an example and may not constitute a limitation to the present disclosure. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the specification are not necessarily all referring to the same embodiment. In addition, some features, structures, or features in the present disclosure of one or more embodiments may be appropriately combined.

Moreover, unless otherwise specified in the claims, the sequence of the processing elements and sequences of the present application, the use of digital letters, or other names are not used to define the order of the application flow and methods. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various assemblies described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure and aiding in the understanding of one or more of the various embodiments. However, this disclosure may not mean that the present disclosure object requires more features than the features mentioned in the claims. In fact, the features of the embodiments are less than all of the features of the individual embodiments disclosed above.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

At last, it should be understood that the embodiments described in the disclosure are used only to illustrate the principles of the embodiments of this application. Other modifications may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An imaging system, comprising:
a volume coil, wherein the volume coil includes a radio frequency component and the radio frequency component is configured to transmit or receive radio frequency signals;
a coil cylinder, wherein the radio frequency component is arranged on the outer side of the coil cylinder;
a shielding layer, arranged on the coil cylinder and covered on a surface of the radio frequency component;
a second support frame, wherein the second support frame is located outside of the coil cylinder; and
a detector, configured to receive gamma photons generated by radionuclides from a subject and arranged inside of the second support frame, wherein the detector is arranged between the shielding layer and the second support frame.

2. The imaging system of claim 1, further comprising:
a support assembly, wherein the support assembly includes a support cylinder, the support cylinder surrounding the outer side of the volume coil;
the detector is arranged inside of the support cylinder; and
the detector is located between the support cylinder and the volume coil.

3. The imaging system of claim 2, wherein the radio frequency component is arranged between the coil cylinder and the detector, and the shielding layer arranged between the radio frequency component and the detector to shield a signal interference between the detector and the radio frequency component.

4. The imaging system of claim 3, wherein the support cylinder and the coil cylinder are arranged coaxially and assembled separately.

5. The imaging system of claim 2, wherein the imaging system further includes a support frame arranged on the outside of the support cylinder,
a connecting component is arranged between the support frame and the support cylinder, and
the connecting component is configured to connect the support frame with the support cylinder.

6. The imaging system of claim 5, wherein the imaging system further includes a second connecting component arranged between the support frame and the volume coil, and the second connecting component is configured to connect the support frame with the volume coil.

7. The imaging system of claim 6, wherein the connecting component is an adjustable component, and the connecting component is configured to adjust a radial distance between the support frame and the support cylinder; or
the second connecting component is an adjustable component, and the second connecting component is configured to adjust a radial distance between the support frame and the volume coil.

8. The imaging system of claim 6, wherein two ends of the volume coil are provided with a connecting portion, respectively, and the connecting portion protrudes from an inner chamber of the support cylinder along an axial direction of the coil cylinder; and
one end of the second connecting component is connected with the connecting portion, and another end of the second connecting component is connected with the support frame.

9. The imaging system of claim 2, an outer side of the support cylinder is provided with a conductive material, and the conductive material forms a faraday cage.

10. The imaging system of claim 1, further comprising:
a support assembly, wherein the support assembly includes the second support frame and a plurality of support arms,
the second support frame and the plurality of support arms are located outside of the volume coil,
the plurality of support arms are arranged at intervals around the volume coil, and
one end of each of the plurality of support arms is connected with the second support frame, and another end of each of the plurality of support arms is connected with the detector.

11. The imaging system of claim 10, wherein the support frame includes a cylindrical superconducting magnet, the superconducting magnet is arranged around the volume coil, one end of each of the plurality of support arms is connected with an inner wall of the cylindrical superconducting magnet, and another end of the each of the plurality of support arms is connected with the detector.

12. The imaging system of claim 1, further comprising:
a support assembly, wherein the support assembly includes the coil cylinder, the coil cylinder supports the volume coil; the detector is installed on an outer wall of the coil cylinder, and the detector is located at radial outside of the coil cylinder relative to the volume coil.

13. The imaging system of claim 12, wherein the shielding layer is arranged between the detector and the volume coil.

14. The imaging system of claim 12, wherein the outer wall of the coil cylinder is provided with at least one protruding structure, the at least one protruding structure protrudes towards the radial outer side of the coil cylinder, the volume coil is installed on the outer wall of the coil cylinder, and the detector is installed on a side of the protruding structure away from the coil cylinder.

15. The imaging system of claim 14, wherein the at least one protruding structure includes a first protrusion and a second protrusion, and the first protrusion and the second protrusion are arranged at intervals along an axial direction of the coil cylinder.

16. The imaging system of claim 15, wherein
the volume coil and the shielding layer are arranged between the first protrusion and the second protrusion;
the detector is provided with two connecting portions, the two connecting portions are connected at both ends of the detector along the axial direction of the coil cylinder, respectively;
the detector is arranged between the first protrusion and the second protrusion, and the two connecting portions are connected with the first protrusion and the second protrusion, respectively.

17. The imaging system of claim 12, wherein the detector is provided with a third protrusion, the third protrusion protrudes towards the radial outer side of the coil cylinder, and the third protrusion is connected with the outer wall of the coil cylinder.

18. The imaging system of claim 12, wherein the outer wall of the coil cylinder is provided with a coil cylinder accommodating tank around the coil cylinder, the volume coil is accommodated within the coil cylinder accommodating tank, and the shielding layer covers the outer wall of the coil cylinder and seals a notch of the coil cylinder accommodating tank.

19. The imaging system of claim 12, wherein the shielding layer is connected with the detector, and the shielding layer is installed on one side of the detector towards the volume coil.

20. The imaging system of claim 12, the detector comprising a plurality of detector units, wherein each of the plurality of detector units extends along an axial direction of the coil cylinder, the plurality of detector units are arranged along the axial direction of the coil cylinder, an installation space is formed between a radial outer side of the coil cylinder and the plurality of detector units, and the volume coil is arranged within the installation space.

* * * * *